(12) United States Patent
Cheatham, III et al.

(10) Patent No.: US 9,721,678 B2
(45) Date of Patent: Aug. 1, 2017

(54) NUCLEAR FUEL ASSEMBLY DESIGN

(71) Applicant: TerraPower, LLC, Bellevue, WA (US)

(72) Inventors: Jesse R. Cheatham, III, Seattle, WA (US); Michael E. Cohen, Seattle, WA (US); Pavel Hejzlar, Kirkland, WA (US); Christopher J. Johns, Tacoma, WA (US); Brian C. Johnson, Renton, WA (US); Robert C. Petroski, Seattle, WA (US); Philip Schloss, Seattle, WA (US); Bao H. Truong, Bellevue, WA (US); Jay R. Tandy, Richland, WA (US); Mark R. Werner, Bellevue, WA (US)

(73) Assignee: TerraPower, LLC, Bellevue, WA (US)

(*) Notice: Subject to any disclaimer, the term of this patent is extended or adjusted under 35 U.S.C. 154(b) by 554 days.

(21) Appl. No.: 14/177,995

(22) Filed: Feb. 11, 2014

(65) Prior Publication Data
US 2014/0341331 A1    Nov. 20, 2014

Related U.S. Application Data

(60) Provisional application No. 61/824,821, filed on May 17, 2013.

(51) Int. Cl.
*G21C 3/324*  (2006.01)
*G21C 3/33*  (2006.01)
(Continued)

(52) U.S. Cl.
CPC ............. *G21C 3/324* (2013.01); *G21C 3/33* (2013.01); *G21C 5/06* (2013.01); *G21C 1/026* (2013.01); *Y02E 30/40* (2013.01)

(58) Field of Classification Search
CPC ..... G21C 3/18; G21C 3/30; G21C 3/33–3/34; G21C 1/02
(Continued)

(56) References Cited

U.S. PATENT DOCUMENTS 3,936,349 A * 2/1976 Prescott ................. G21C 3/12
                                                    376/434
4,142,934 A * 3/1979 Wild .................... G21C 3/324
                                                    376/434
(Continued)

FOREIGN PATENT DOCUMENTS

GB    1499955 A    2/1978
GB    2102617 A    2/1983
(Continued)

OTHER PUBLICATIONS

International Search Report and Written Opinion for PCT Application No. PCT/US2014/038113, dated Nov. 20, 2014, 12 pages.
(Continued)

*Primary Examiner* — Jack W Keith
*Assistant Examiner* — Lily C Garner

(57) ABSTRACT

A duct for a nuclear fuel assembly includes a tubular body and an elongated member. The tubular body has a sidewall with an inner face and an outer face and is configured to contain nuclear fuel within a fuel region. The elongated member extends from the outer face along at least a portion of the fuel region and has a contact surface configured to stabilize the duct during operation of the nuclear fuel assembly.

28 Claims, 26 Drawing Sheets

(51) Int. Cl.
*G21C 5/06* (2006.01)
*G21C 1/02* (2006.01)

(58) Field of Classification Search
USPC .......................................................... 376/409
See application file for complete search history.

(56) References Cited

U.S. PATENT DOCUMENTS

| | | | |
|---|---|---|---|
| 4,181,571 A | | 1/1980 | Jolly |
| 4,306,938 A | * | 12/1981 | Yamanaka ................ G21C 3/12 376/448 |
| 4,316,770 A | | 2/1982 | Hutter |
| 4,543,233 A | | 9/1985 | Grover et al. |
| 6,097,779 A | * | 8/2000 | Challberg ................ G21C 5/06 376/353 |
| 2010/0027734 A1 | | 2/2010 | Kim et al. |
| 2011/0110485 A1 | | 5/2011 | Koga et al. |
| 2012/0201343 A1 | | 8/2012 | Ravenet |

FOREIGN PATENT DOCUMENTS

| | | |
|---|---|---|
| JP | 53-136190 | 11/1978 |
| JP | H01172797 A | 7/1989 |
| JP | 2006-145506 | 6/2006 |

OTHER PUBLICATIONS

Koch, Leonard J., "An Integrated Experimental Fast Reactor Nuclear Power Station", Experimental Breeder Reactor-II (EBR-II), Published on Jun. 30, 2008, Chapters 1-3, 90 pages.
Sodium-cooled fast reactor, From Wikipedia, the free encyclopedia (en.wikipedia.org/wiki/Sodium-cooled_fast_reactor), retrieved on Apr. 25, 2013, 4 pages.
Structural Materials for Liquid Metal Cooled Fast Reactor Fuel Assemblies—Operational Behaviour, International Atomic Energy Agency, 2012, 103 pages.
Sutherland W. H., "Overview of Core Designs and Requirements/Criteria for Core Restraint Systems", Hanford Engineering Development Laboratory, Sep. 1984, 15 pages.
Supplemental European Search Report for EP 14798334 date mailed Dec. 23, 2016.

* cited by examiner

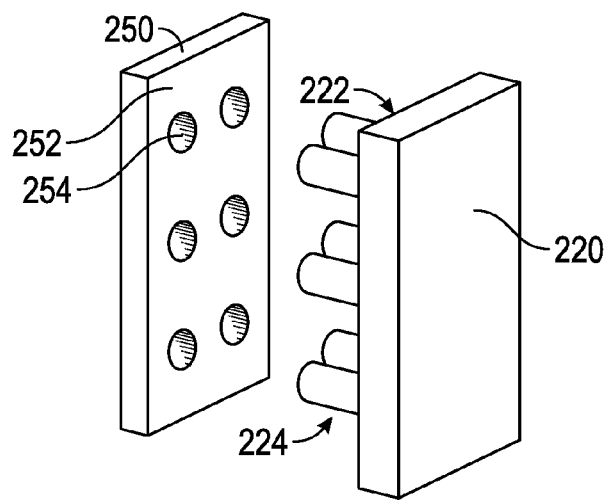
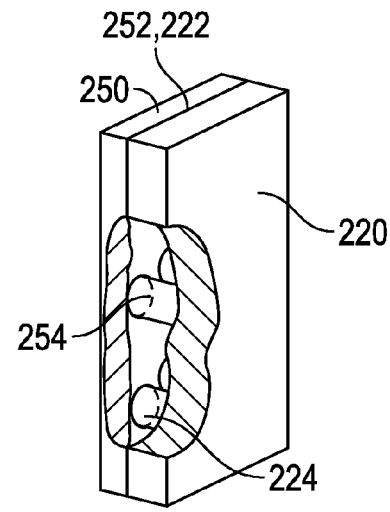
FIG. 13A  FIG. 13B
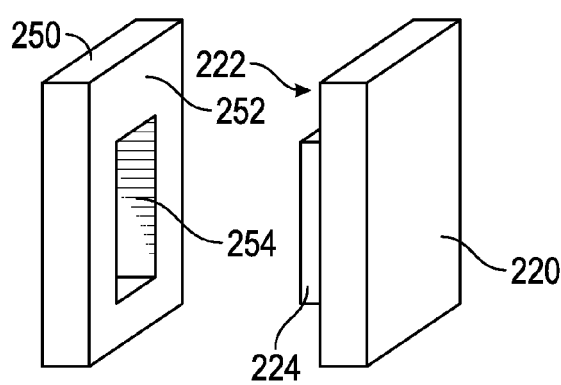
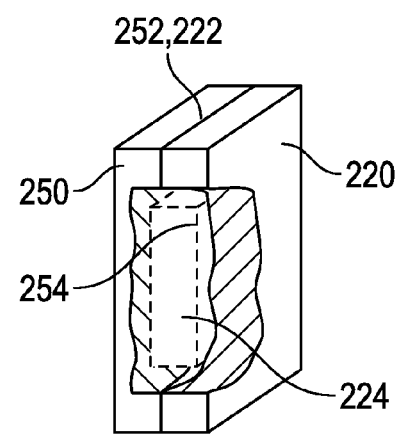
FIG. 14A  FIG. 14B

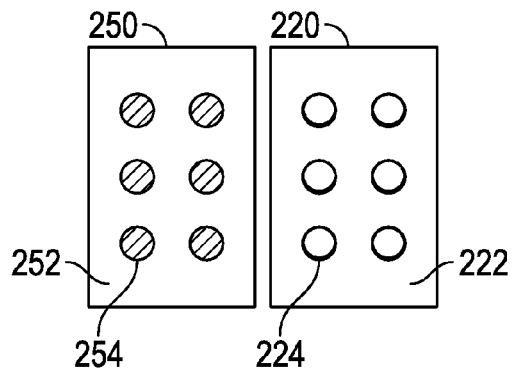 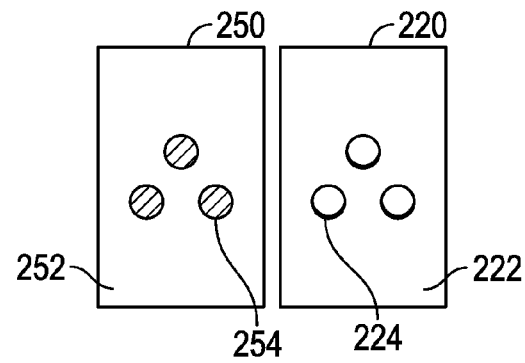
FIG. 15A  FIG. 15B
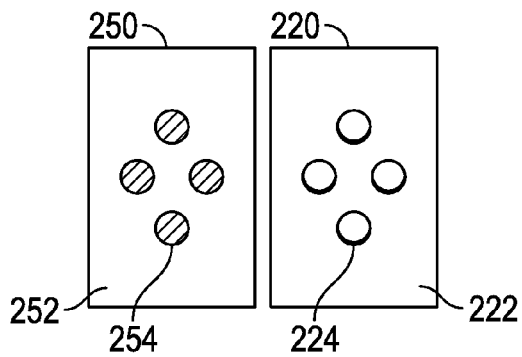 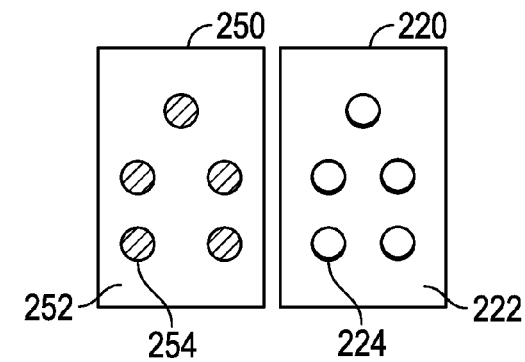
FIG. 15C  FIG. 15D

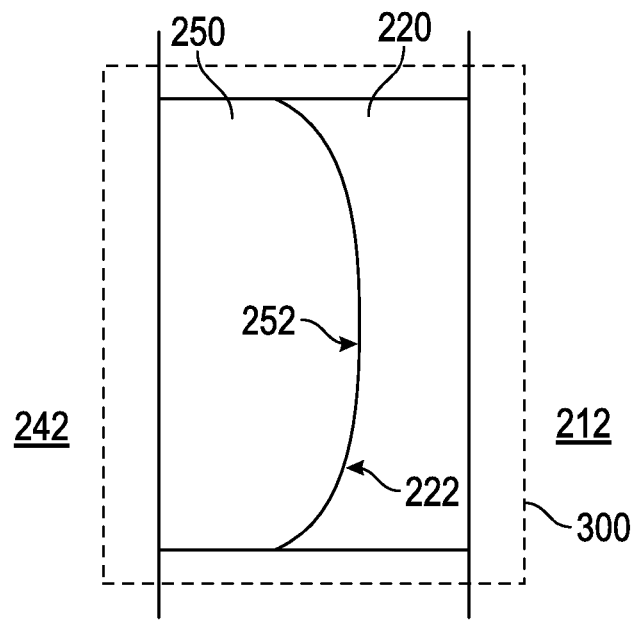
FIG. 17A
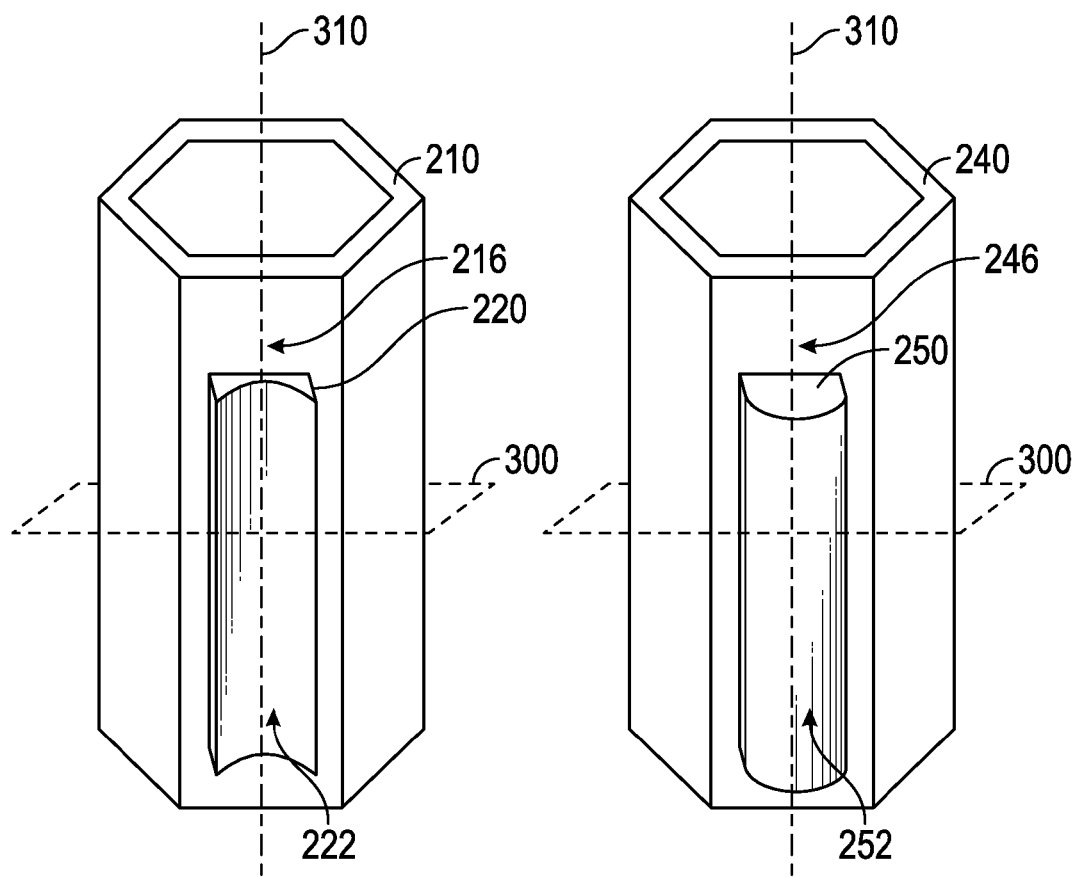
FIG. 17B  FIG. 17C

NUCLEAR FUEL ASSEMBLY DESIGN

CROSS-REFERENCE TO RELATED APPLICATIONS

The present application is related to and claims the benefit of the earliest available effective filing date from the following listed application (the "Priority Application") (e.g., claims benefits under 35 USC §119(e) for provisional patent applications, for any and all parent, grandparent, great-grandparent, etc. applications of the Priority Application).

For purposes of the USPTO extra-statutory requirements, the present application claims benefit of priority of U.S. Provisional Patent Application No. 61/824,821, entitled Nuclear Fuel Assembly for Long Life, naming Jesse R. Cheatham, III; Michael E. Cohen; Christopher J. Johns; Brian C. Johnson; and Philip M. Schloss as inventors, filed May 17, 2013, which is within the twelve months preceding the filing date of the present application.

All subject matter of the Priority application is incorporated herein by reference to the extent such subject matter is not inconsistent herewith.

BACKGROUND

The present patent application relates to nuclear fission reactors and fuel assemblies, particularly for fast reactors, such as a traveling wave reactor. Fast reactors include a reactor vessel containing a reactor core. The reactor core includes a plurality of fuel assemblies. Liquid coolant passes through the reactor core, absorbing thermal energy from the nuclear fission reactions that take place in the reactor core. The coolant then passes to a heat exchanger and a steam generator, transferring the thermal energy to steam in order to drive a turbine that generates electricity.

Fast reactors are designed to increase the utilization efficiency of uranium in fission reactions. Fast reactors can capture significantly more of the energy potentially available in natural uranium than typical light-water reactors. Production of energy in the fast reactor core is intense because of the high-energy neutrons that are employed. However, the high burnup and energy intensity in fast reactors also stresses the structural materials in the fuel assembly to a greater degree relative to light-water reactors.

Fuel assemblies in fast nuclear fission reactor cores traditionally include a simple solid hexagonal tube surrounding a plurality of fuel elements, such as fuel pins. The tube directs coolant past the fuel pins, which are organized into a fuel bundle. The tube allows individual assembly orificing, provides structural support for the fuel bundle, and transmits handling loads from the handling socket to the inlet nozzle. Fuel pins are composed of nuclear fuel surrounded by cladding, which prevents radioactive material from entering the coolant stream. The coolant stream may be a liquid metal, such as liquid sodium.

The hexagonal tubes degrade and deform from exposure to high temperatures (e.g., 300° C. to 700° C.), intensive radiation damage, and corrosion and other chemical interactions with the liquid metal coolant. Several phenomena, including irradiation creep, void swelling, bowing, and dilation, cause tubes to deform. The interstitial gap between adjacent tube walls closes during fuel assembly service life. For high burnup assemblies, the lifetime of the assembly is limited by mismatch between fuel pin swelling and dilation, which either allows coolant bypass around the periphery of the pin bundle, or reduction of coolant channels within the assembly due to compression of the pin bundle by the tube wall.

Irradiation creep occurs as high-energy neutrons impinge on the tube and displace tube particles. Irradiation creep, duct dilation due to coolant pressure, and void swelling increase the diameter of the tube (i.e. cause expansion). Similarly, tubes may bow due to gradients in temperature, pressure, and radiation dose. Such gradients cause an imbalance in the macroscopic forces along the tube face. These problems, which warp and embrittle the tube structure, also increase the force necessary to withdraw fuel assemblies from the reactor, thus limiting the fuel assembly service life. Despite these deficiencies, hexagonal tubes continue to be used in fast reactors.

Under service conditions in high-burnup fast reactors, such as breed-and-burn reactors (of which one type is a traveling wave reactor ("TWR")), a simple hexagonal duct may not be able to withstand duct wall pressure differential, void swelling, and/or subsequent irradiation induced creep. This could result in unacceptable duct face dilation and duct bowing, thereby resulting in a fuel assembly design life which might not be able to support the high burnup required to achieve an equilibrium breed-and-burn cycle with depleted uranium feed assemblies. The typical approach in a core restraint system is to manage local duct dilation by adding interstitial space between ducts to allow room for duct face dilation to occur. Additionally, to manage duct bowing caused by void swelling, the core restraint system utilizes three load planes—the inlet nozzle, the above-core load pad, and the top load pad—to permit irradiation creep to offset the effects of swelling induced fuel assembly duct bowing, yet provide space for the duct faces to dilate outward toward the adjacent duct faces.

SUMMARY

Disclosed embodiments include nuclear fuel assembly ducts, nuclear fuel assemblies for nuclear reactors, nuclear reactors, methods for manufacturing ducts for nuclear fuel assemblies, and methods for loading a nuclear reactor.

According to one embodiment, a duct for a nuclear fuel assembly includes a tubular body and an elongated member. The tubular body has a sidewall with an inner face and an outer face and is configured to contain nuclear fuel within a fuel region. The elongated member extends from the outer face along at least a portion of the fuel region and has a contact surface configured to stabilize the duct during operation of the nuclear fuel assembly.

According to another embodiment, a fuel assembly for a nuclear reactor includes a tubular body, a plurality of fuel pins disposed within the tubular body, and an elongated member. The tubular body has a sidewall with an inner face and an outer face. A length of the tubular body containing the plurality of nuclear fuel pins defines a fuel region. The elongated member extends from the outer face along at least a portion of the fuel region and has a contact surface configured to strengthen the tubular body as the fuel assembly is operated.

According to still another embodiment, a nuclear reactor includes a reactor vessel and a nuclear reactor core disposed in the reactor vessel. The nuclear reactor core includes a first fuel assembly, a second fuel assembly, a first elongated member, and a second elongated member. The first fuel assembly includes a first tubular body having a sidewall with an inner face and an outer face and is configured to contain nuclear fuel within a fuel region. The second fuel assembly includes a second tubular body configured to be positioned alongside the first tubular body and having a sidewall with an inner face and an outer face. The first elongated member extends from the outer face of the first tubular body along at least a portion of the fuel region and has a first contact surface. The second elongated member extends from the outer surface of the second tubular body. The second elongated member has a corresponding contact surface configured to engage the first contact surface to stabilize the first tubular body and the second tubular body during operation of the nuclear reactor.

According to yet another embodiment, a method of manufacturing a duct for a nuclear fuel assembly includes providing a tubular body having a sidewall with an inner face and an outer face, the tubular body configured to contain nuclear fuel within a fuel region. The method also includes defining an elongated member on the outer face along at least a portion of the fuel region, the elongated member having a contact surface configured to stabilize the duct during operation of the nuclear fuel assembly.

According to another embodiment, a method of loading a nuclear reactor includes positioning a first fuel assembly within a nuclear reactor core and positioning a second fuel assembly alongside the first fuel assembly. The first fuel assembly includes a first tubular body and a first elongated member. The first tubular body has a sidewall with an inner face and an outer face and is configured to contain nuclear fuel within a fuel region. The first elongated member extends from the outer face along at least a portion of the fuel region and has a first contact surface. The second fuel assembly includes a second tubular body and a second elongated member. The second tubular body has a sidewall with an inner face and an outer face. The second elongated member extends from the outer face. The second elongated member has a corresponding contact surface configured to engage the first contact surface to stabilize the first tubular body and the second tubular body during operation of the nuclear reactor.

The foregoing is a summary and thus may contain simplifications, generalizations, inclusions, and/or omissions of detail; consequently, those skilled in the art will appreciate that the summary is illustrative only and is NOT intended to be in any way limiting. In addition to any illustrative aspects, embodiments, and features described above, further aspects, embodiments, and features will become apparent by reference to the drawings and the following detailed description. Other aspects, features, and advantages of the devices and/or processes and/or other subject matter described herein will become apparent in the teachings set forth herein.

BRIEF DESCRIPTION OF THE FIGURES

FIGS. 6-8A are cross-sectional views of a duct for a nuclear fuel assembly, according to one embodiment;

FIGS. 13A-14B are elevation views of a first elongated member and a second elongated member for a nuclear fuel assembly, according to various embodiments;

FIGS. 15A-15D are front plan views of a first elongated member and a second elongated member for a nuclear fuel assembly, according to various embodiments;

FIG. 17A is a top plan view of a first elongated member and a second elongated having mating shapes, according to one embodiment;

FIGS. 17B-17C are elevation views of a first elongated member and a second elongated having mating shapes, according to one embodiment;

DETAILED DESCRIPTION

Introduction

Figure 1A:
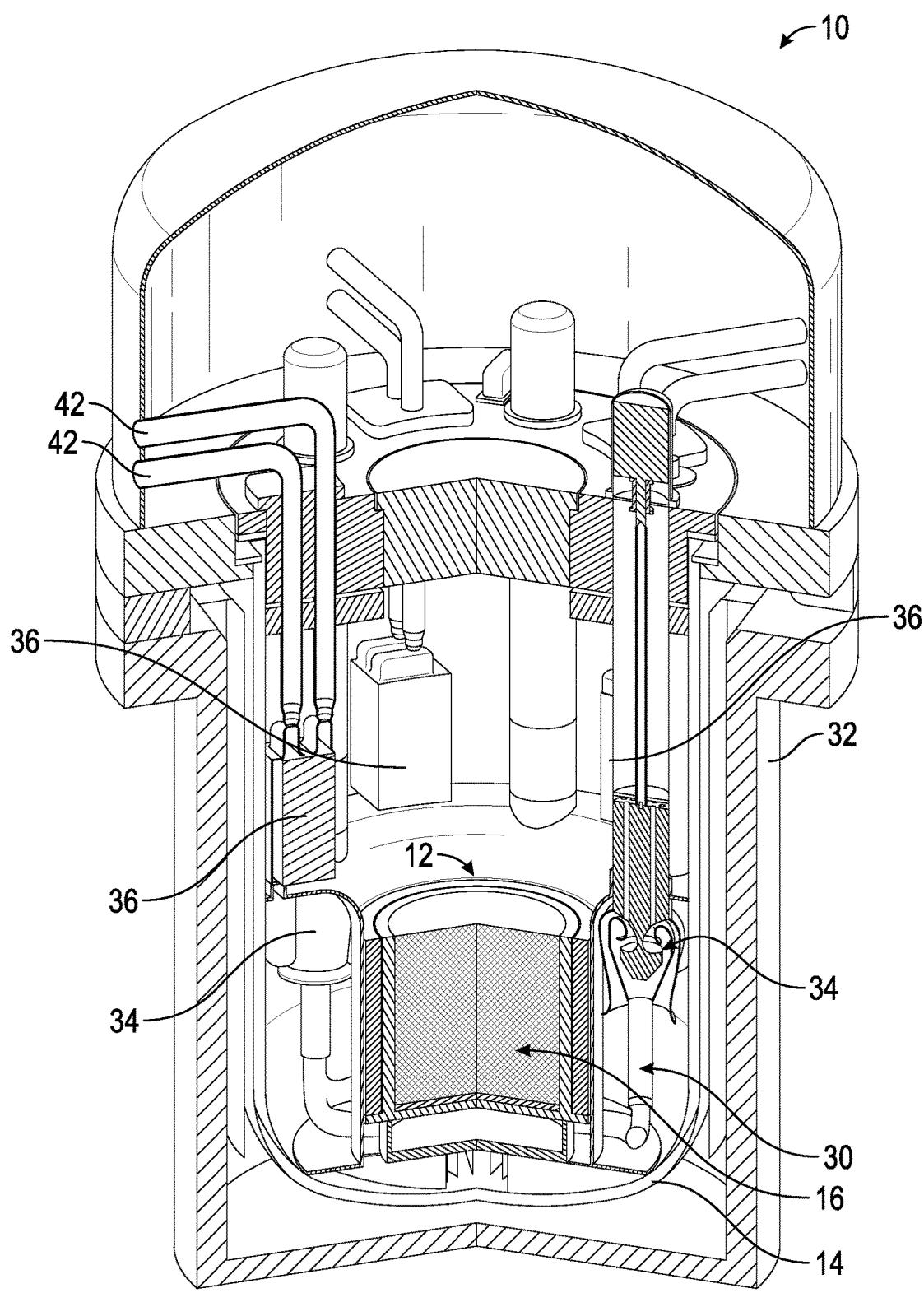
FIGS. 1A-1C are partial-cutaway perspective views of a nuclear fission reactor, according to one embodiment.

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/ process(es) headings; and/or descriptions of single topics may span two or more topic headings). Hence, the use of the formal outline headings is not intended to be in any way limiting.

Overview

Given by way of overview, illustrative embodiments include: nuclear fuel assemblies; ducts for nuclear fuel assemblies; nuclear fission reactor cores; nuclear fission reactors; methods of accommodating nuclear fuel assembly duct swelling; methods of fabricating a nuclear fuel assembly; and methods of loading fuel assemblies into a nuclear fission reactor core.

Embodiments of this new duct design help reduce life-limiting constraints while simultaneously reducing the required duct structural material and interstitial sodium, which has a significant positive compound effect on the nuclear core design. The reduction in structural material and interstitial sodium reduces the burnup requirement in the discharged fuel assemblies, allows the core designer the option to reduce core height, and allows the core designer to add sodium coolant inside the ducts, which improves the thermal hydraulic performance of the core. This new duct design is relatively simple to manufacture, roughly the same order of magnitude of difficulty as a standard hexagonal duct.

Embodiments of this fuel duct design use a simple concept to efficiently force the sodium coolant past the fuel pins in a highly uniform way throughout the lifetime of very high burnup fuel with minimal structural material, acceptable insertion and withdrawal loads, low manufacturing costs, excellent operational stability, very good service lifetime dimensional stability, negligible service induced degradation, and the ability to accommodate fuel pin swelling to mitigate typical fuel pin-to-bundle interaction problems.

Embodiments of this duct design have external contact features or "elongated members" designed to constructively direct duct material void swelling to specific regions of the duct perimeter while effectively eliminating creep induced duct dilation. Embodiments of the elongated member duct are designed so that elongated members of neighboring ducts come into contact at operating temperature. The elongated member then becomes a support point, which prevents mid-face dilation. The elongated member features are designed to initiate duct-to-duct contact (operational stability) at hot standby conditions and provide full-length elongated member contact when full outlet temperature is attained. This allows the internal pressure within adjacent ducts to offset one another to effectively reduce the pressure load acting on the ducts to the difference between the two adjacent duct assemblies. The elongated member reduces the unsupported span of the duct face by more than one-half so the duct thickness can be greatly reduced.

The use of the "elongated member" feature eliminates low power core instability that occurs in similar core designs such as the Fast Flux Test Facility ("FFTF") and the Clinch River Breeder Reactor ("CRBR") by providing duct-to-duct contact in the lower region of the fuel region prior to going critical. This problem was not solved in FFTF or CRBR and in the case of a large core, such as CRBR or TWRs, results in unavoidable core compaction during power ascension as the ducts settle in or the core "locks".

Embodiments of this device provide limited compliance when the pin bundle grows later in life in that the pin bundle can expand out into the regions adjacent to the "elongated members" and promote additional creep induce duct dilation locally to accommodate the pin bundle.

Nuclear Fission Reactor

Figure 1B:
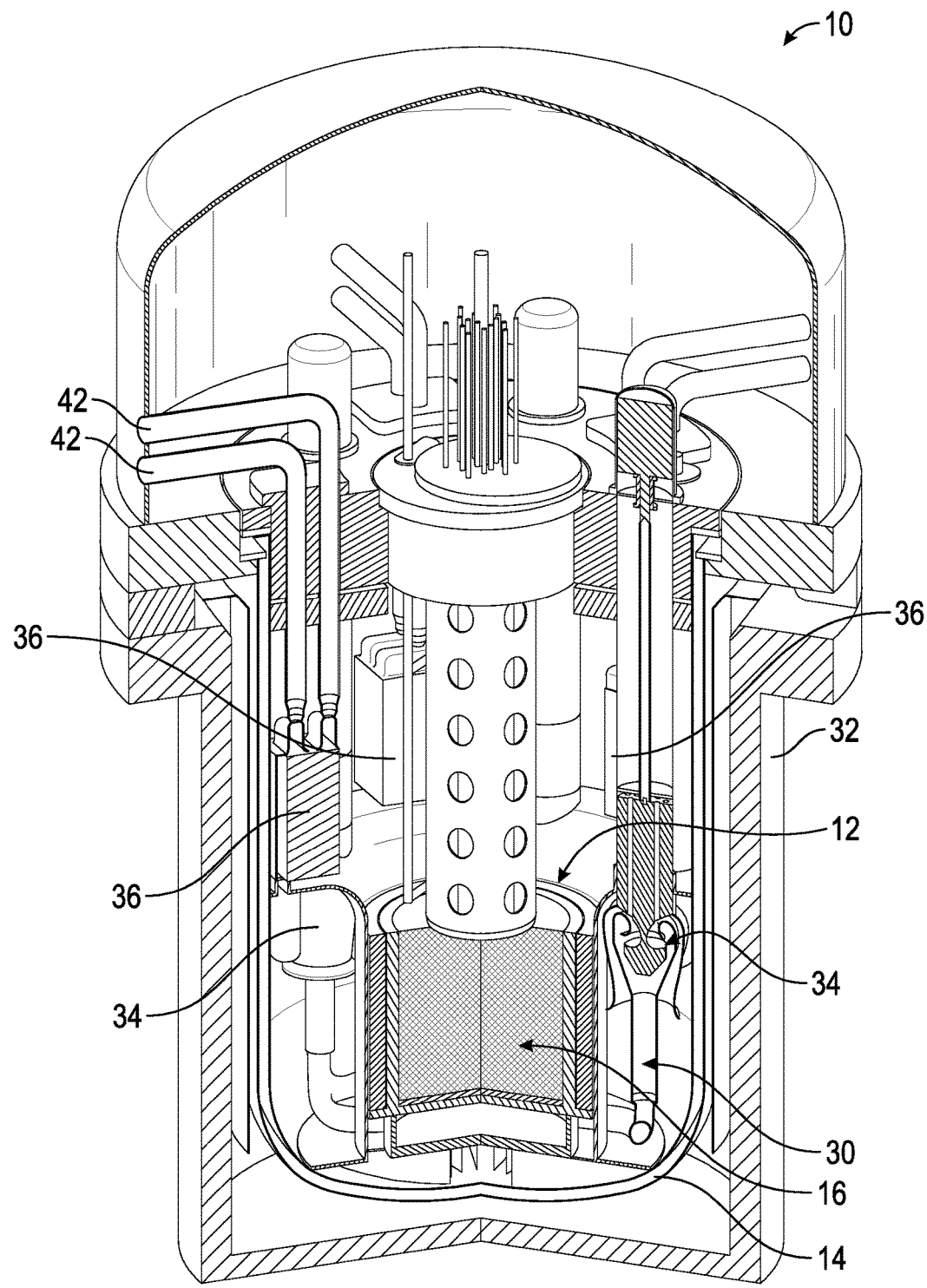
Figure 1C:
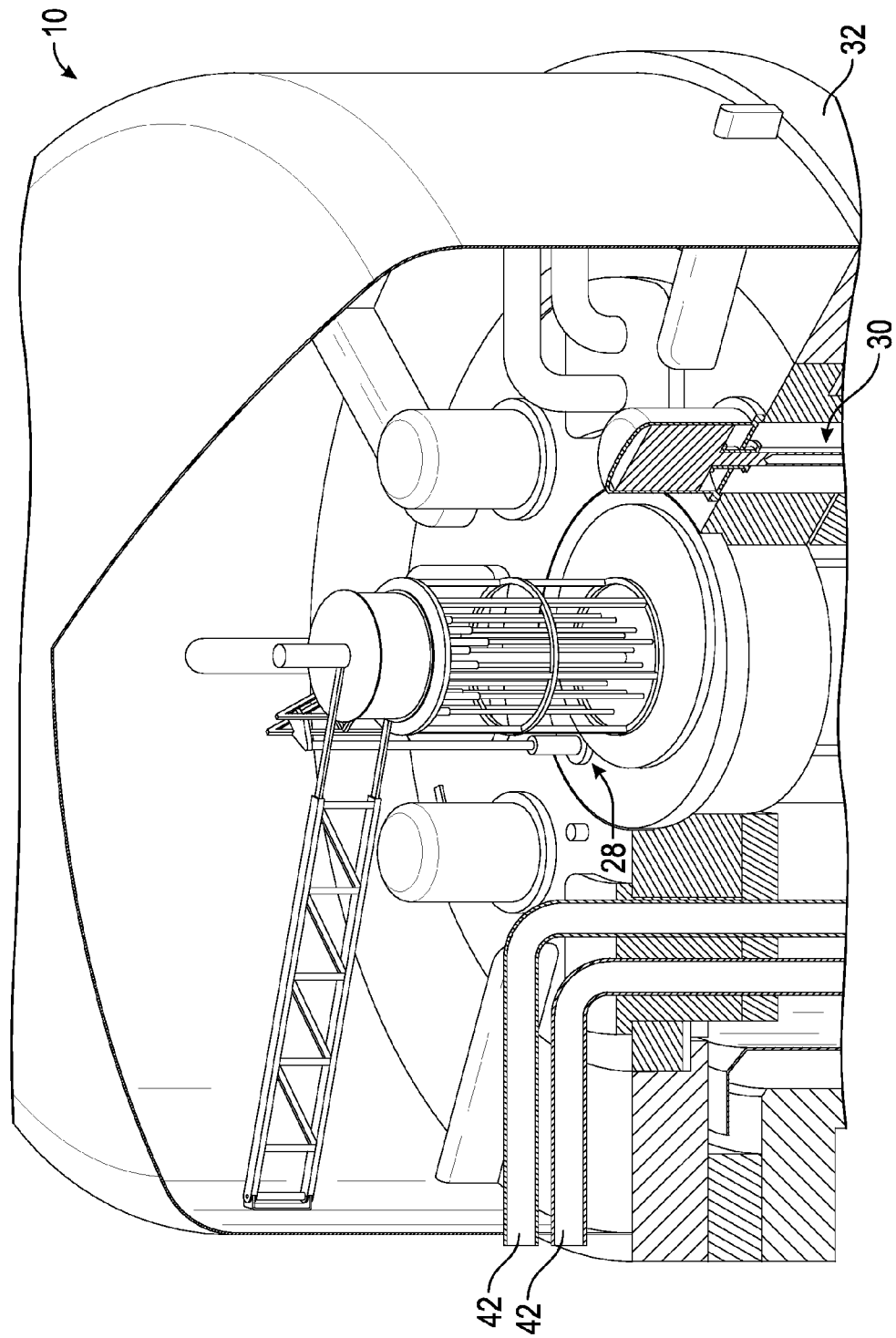
Figure 2:
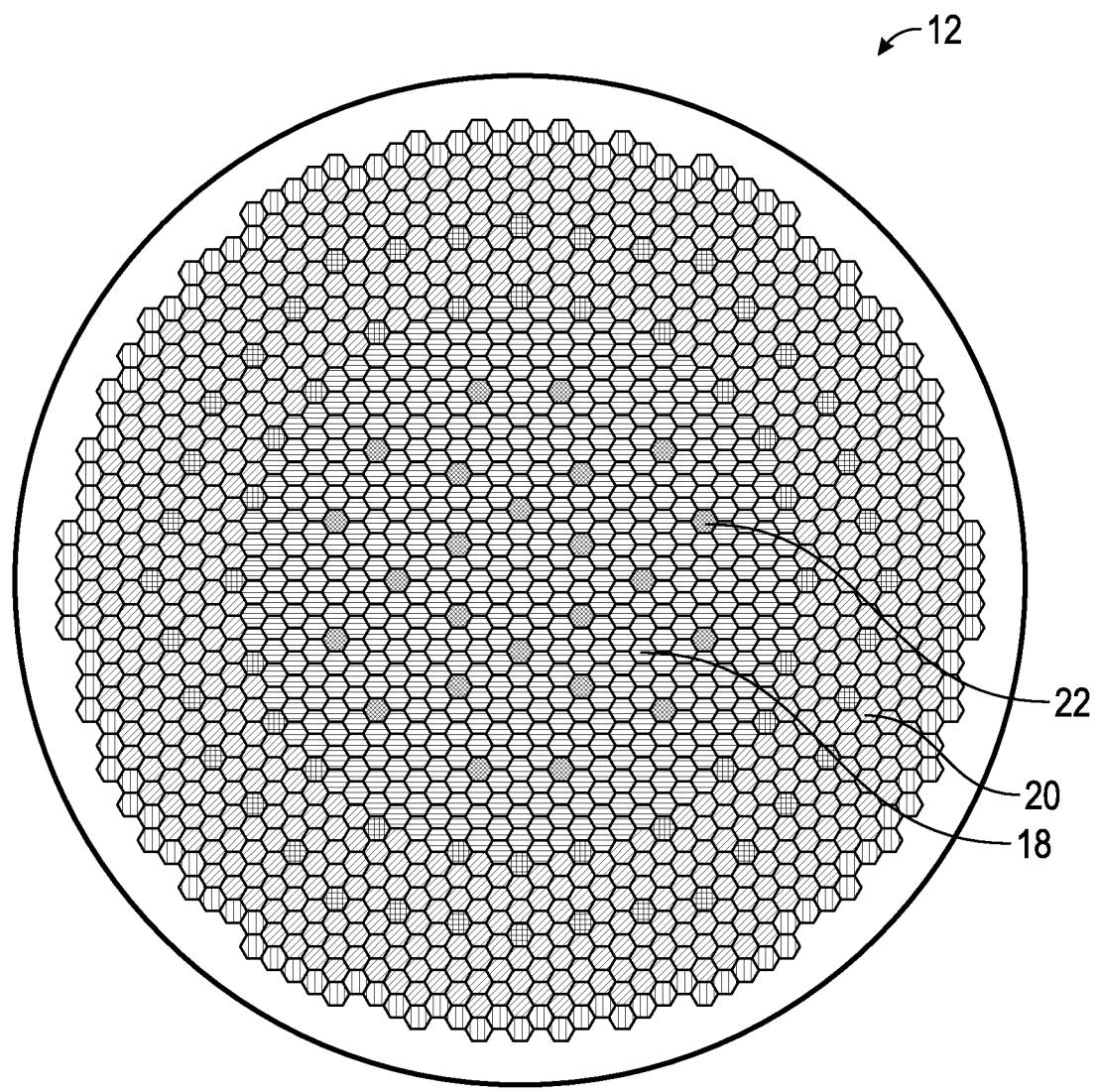
FIG. 2 is a top sectional view of a reactor core for a nuclear fission reactor, according to one embodiment.

Referring to FIGS. 1A-1C and FIG. 2 and given by way of non-limiting overview, an illustrative nuclear fission reactor 10 will be described by way of illustration and not of limitation. As shown in FIGS. 1A-1B, nuclear fission reactor 10 includes a nuclear fission reactor core 12 disposed in a reactor vessel 14. According to one embodiment, nuclear fission reactor core 12 contains nuclear fuel within a central core region 16. As shown in FIG. 2, nuclear fission reactor core 12 includes fissile nuclear fuel assemblies 18, fertile nuclear fuel assemblies 20, and movable reactivity control assemblies 22. In other embodiments, nuclear fission reactor core 12 includes only fissile nuclear fuel assemblies 18 and fertile nuclear fuel assemblies 20. According to the embodiment shown in FIGS. 1A-1C, an in-vessel handling system 26 is configured to shuffle ones of the fissile nuclear fuel assemblies 18 and ones of the fertile nuclear fuel assemblies 20. As shown in FIGS. 1A-1C, nuclear fission reactor 10 also includes a reactor coolant system 30.

Still referring to FIGS. 1A-1C and FIG. 2, embodiments of the nuclear fission reactor 10 may be sized for any application as desired. For example, various embodiments of the nuclear fission reactor 10 may be used in low power (around 300 $MW_e$-around 500 $MW_e$) applications, medium power (around 500 $MW_e$-around 1000 $MW_e$) applications, and large power (around 1000 $MW_e$ and above) applications as desired.

Embodiments of the nuclear fission reactor 10 are based on elements of liquid metal-cooled, fast reactor technology. For example, in various embodiments the reactor coolant system 30 includes a pool of liquid sodium disposed in the reactor vessel 14. In such cases, the nuclear fission reactor core 12 is submerged in the pool of sodium coolant in the reactor vessel 14. The reactor vessel 14 is surrounded by a containment vessel 32 that helps prevent loss of sodium coolant in the unlikely case of a leak from the reactor vessel 14.

In various embodiments, the reactor coolant system 30 includes a reactor coolant pump, shown as pump 34. As shown in FIGS. 1A-1B, reactor coolant system 30 includes two pumps 34. Pumps 34 may be any suitable pump as desired (e.g., an electromechanical pump, an electromagnetic pump, etc.).

Referring still to FIGS. 1A-1B, reactor coolant system 30 also includes heat exchangers 36. Heat exchangers 36 are disposed in the pool of liquid sodium. Heat exchangers 36 have non-radioactive intermediate sodium coolant on the other side of heat exchangers 36, according to one embodiment. To that end, heat exchangers 36 may be considered intermediate heat exchangers. According to one embodiment, steam generators are in thermal communication with the heat exchangers 36. It will be appreciated that any number of pumps 34, heat exchangers 36, and steam generators may be used as desired.

The pumps 34 circulate primary sodium coolant through the nuclear fission reactor core 12. The pumped primary sodium coolant exits the nuclear fission reactor core 12 at a top of the nuclear fission reactor core 12 and passes through one side of the heat exchangers 36. According to one embodiment, heated intermediate sodium coolant is circulated via intermediate sodium loops 42 to the steam generators that, in turn, generate steam to drive turbines and electrical generators. According to other embodiments, heated intermediate sodium coolant is circulated to heat exchangers for still another use.

The operation and construction of nuclear reactors is described by way of example and not of limitation in U.S. patent application Ser. No. 12/930,176, entitled Standing Wave Nuclear Fission Reactor and Methods, naming Charles E. Ahlfeld, Thomas M. Burke, Tyler S. Ellis, John Rogers Gilleland, Jonatan Hejzlari, Pavel Hejzlar, Roderick A. Hyde, David G. McAlees, Jon D. McWhirter, Ashok Odedra, Robert C. Petroski, Nicholas W. Touran, Joshua C. Walter, Kevan D. Weaver, Thomas Allan Weaver, Charles Whitmer, Lowell L. Wood, Jr., and George B. Zimmerman as inventors, filed Dec. 30, 2010, the contents of which are hereby incorporated by reference.

Nuclear Fission Reactor Core and Fuel Assemblies

Figure 3:
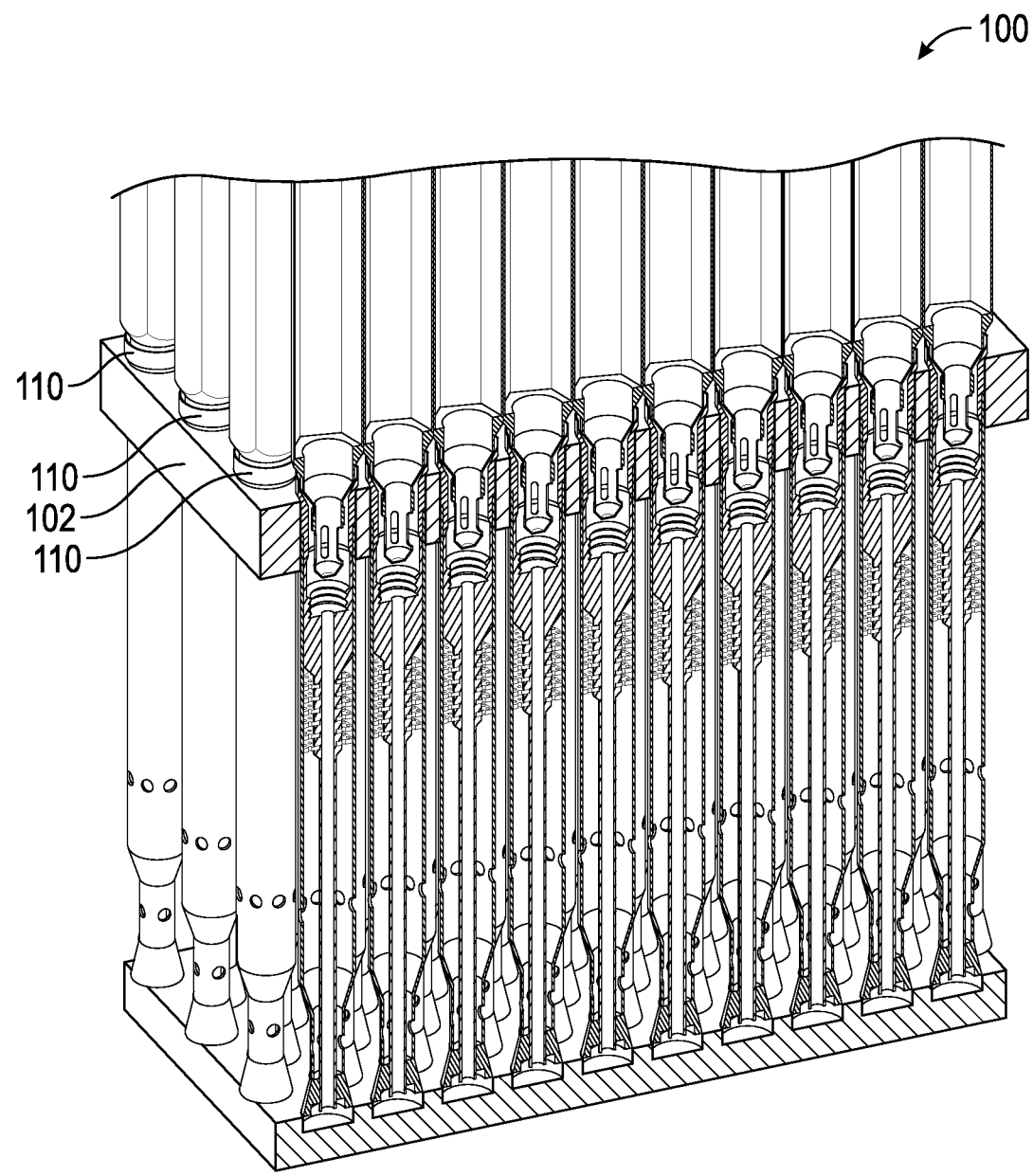
FIG. 3 is a partial elevation view of a nuclear fission reactor core, according to one embodiment.
Figure 4:
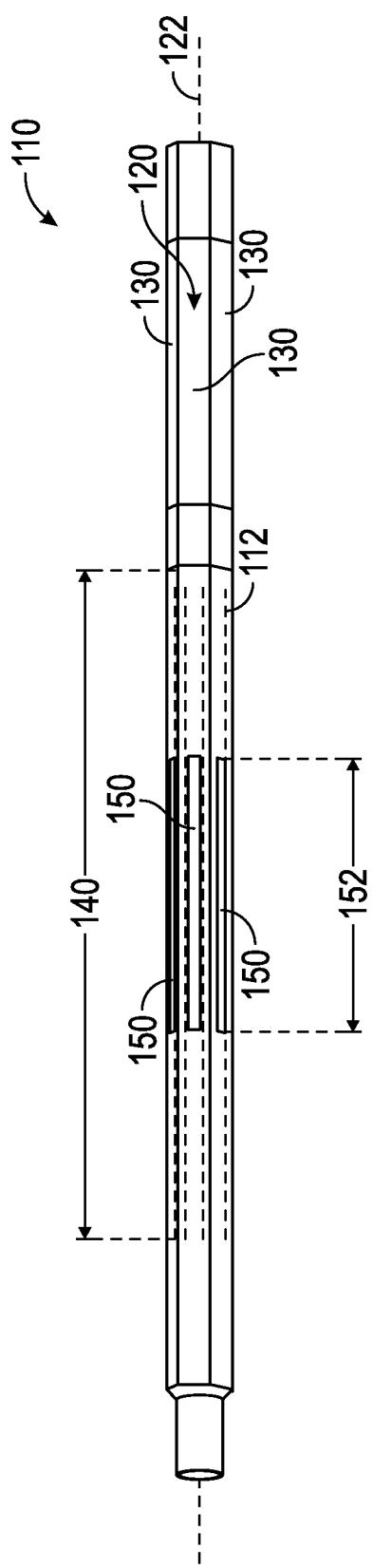
FIG. 4 is a side plan view of a duct for a nuclear fuel assembly, according to one embodiment.

Referring to the embodiment shown in FIGS. 3-4, a nuclear fission reactor core 100 (e.g., nuclear fission reactor core 12, etc.) includes a plurality of nuclear fuel assemblies (e.g., fissile nuclear fuel assemblies 18, fertile nuclear fuel assemblies 20, movable reactivity control assemblies 22, etc.), shown as fuel assemblies 110. As shown in FIG. 3, fuel assemblies 110 are supported in part by a core support grid plate 102. Primary sodium coolant flows through fuel assemblies 110, according to one embodiment.

As shown in FIG. 4, fuel assembly 110 includes a plurality of nuclear fuel pins (e.g., fuel rods, fuel elements, etc.), shown as nuclear fuel pins 112, disposed within a duct that includes a tubular body, shown as tubular body 120. As shown in FIG. 4, tubular body 120 has a hexagonal cross-sectional shape. In other embodiments, tubular body 120 has another polygonal cross sectional shape (e.g., rectangular, pentagonal, etc.). In still other embodiments, tubular body 120 has still another cross sectional shape (e.g., circular, rounded, irregular, etc.). According to the embodiment shown in FIG. 4, tubular body 120 includes a plurality of sidewalls, shown as sidewalls 130, that extend along a longitudinal axis 122 of tubular body 120. In one embodiment, tubular body 120 is manufactured of HT-9 steel. Tubular body 120 has a very low void swelling rate relative to traditional ducts such that the combined effect of irradiation creep and void swelling is dominated by creep. In turn, the elastic spring forces in tubular body 120, which determine the magnitude of the force necessary to insert and withdraw fuel assemblies, will be relatively low.

As shown in FIG. 4, in some embodiments, tubular body 120 is configured to contain nuclear fuel within a fuel region, shown as fuel region 140. Fuel region 140 extends between an upper blanket end and a lower blanket end, according to one embodiment. In various embodiments, nuclear fuel pins 112 include metal fuel or metal oxide fuel (regardless of whether the fuel is fissile fuel or fertile fuel). It will be appreciated that metal fuel offers high heavy metal loadings and excellent neutron economy, which is desirable for the breed-and-burn process in the nuclear fission reactor core 100. In one embodiment, fuel region 140 is defined by a length of tubular body 120 containing the plurality of nuclear fuel pins 112. In some embodiments, a nuclear fuel pin 112 is at least one of a control assembly (not shown) and a test assembly (not shown). The control assembly and the test assembly may include control instrumentation and test instrumentation, respectively, instead of or in addition to nuclear fuel. The control assembly and/or the test assembly may be structurally similar to nuclear fuel pins 112 that include nuclear fuel. In one embodiment, at least one of a control assembly and a test assembly is disposed along the length of tubular body 120 within fuel region 140. Accordingly, the term "nuclear fuel pin" is intended to include a control assembly and/or a test assembly.

Referring still to FIG. 4, at least one of a duct and fuel assembly 110 includes an elongated member, shown as elongated member 150. According to the embodiment shown in FIG. 4, elongated member 150 extends from sidewall 130 along a portion of fuel region 140. In one embodiment, elongated member 150 includes a contact surface configured to stabilize tubular body 120 as fuel assembly 110 is operated (e.g., as part of a nuclear reactor core). As shown in FIG. 4, elongated member 150 extends along longitudinal axis 122 of tubular body 120.

As shown in FIG. 4, elongated member 150 extends within a support region, shown as support region 152. Extension of elongated member 150 along longitudinal axis 122 facilitates the stabilization of tubular body 120 within support region 152 and reduces the risk of disengagement between neighboring elongated members 150. In one embodiment, support region 152 is defined along a length of fuel region 140 (or, for a control assembly or a test assembly, a length that corresponds to the length of fuel region 140). As shown in FIG. 4, each elongated member 150 extends along the entire length of support region 152. In one embodiment, elongated member 150 includes a plurality of plates. The plurality of plates may define a plurality of slots that extend across the longitudinal axis of tubular body 120. In one embodiment, the plurality of plates have a uniform width. In another embodiment, the plurality of plates have a uniform length. In still another embodiment, the plurality of plates have lengths that decrease from a first length at the upper blanket end to a second length at the lower blanket end. According to another embodiment, each elongated member 150 extends along a portion of support region 152. By way of example, a plurality of longitudinally spaced elongated members 150 may be positioned end-to-end and span support region 152. In one embodiment, the plurality of longitudinally spaced elongated members have lengths that decrease from a first length at the upper blanket end to a second length at the lower blanket end.

In one embodiment, nuclear fission reactor core 100 employs an improved limited free bow core restraint system design. The limited free bow core design includes above-core or middle load pads and top load pads to induce an 'S' shape in fuel assemblies 110. Elongated members 150 of neighboring (e.g., nearby, adjacent, etc.) fuel assemblies 110 contact one another during operation of nuclear fission reactor core 100. Elongated members 150 offer contact points along outer faces of fuel assemblies 110, thereby providing spacing and support, managing swelling and dilation, and mitigating fuel assembly degradation and deformation. Elongated member 150 minimizes the friction forces associated with fuel assembly insertion and withdrawal. Elongated member 150 provides the dimensional stability and operational stability required to meet or exceed the demands of the high fuel burnup and irradiation fluence required in a fast reactor (e.g., a travelling wave reactor). Elongated member 150 produces a barrel-shaped expansion profile for nuclear fission reactor core 100 compared with previous designs that flowered outward above the top load pads. Such a barrel-shaped expansion profile reduces the uncertainty associated with traditional limited free bow systems.

Figure 5:
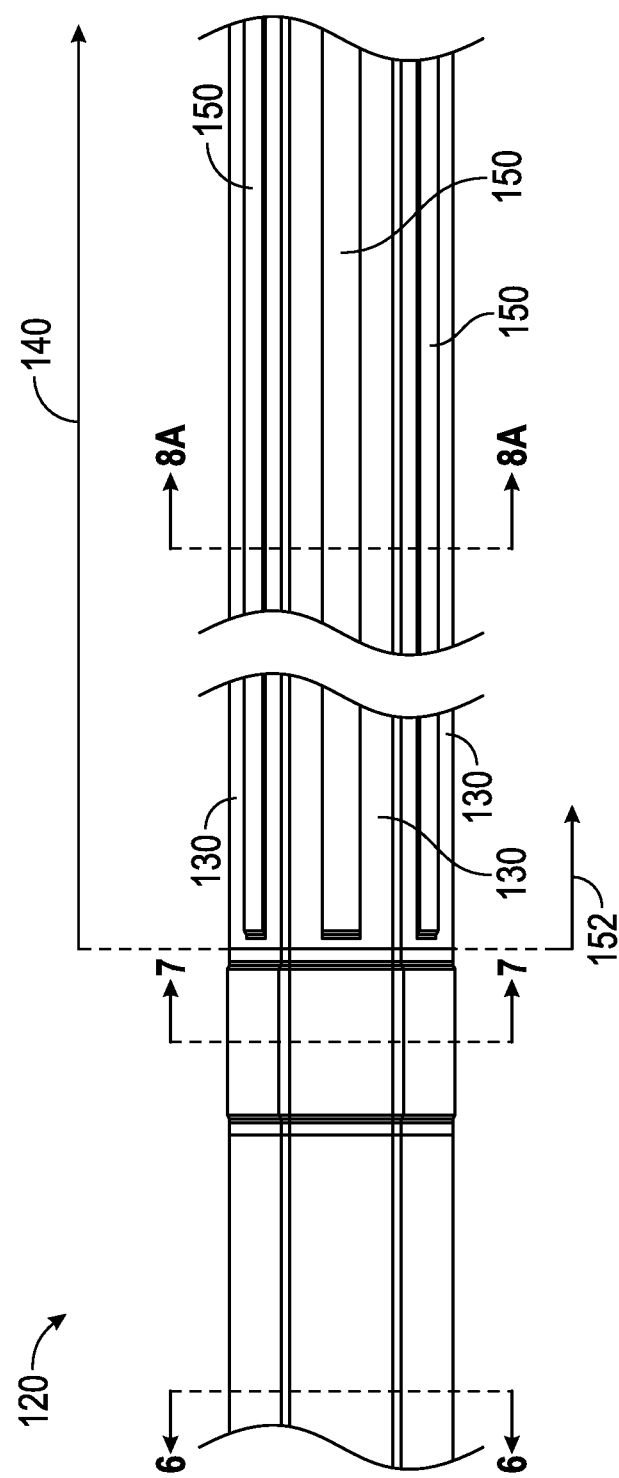
FIG. 5 is a partial side plan view of a duct for a nuclear fuel assembly, according to one embodiment.
Figure 6:
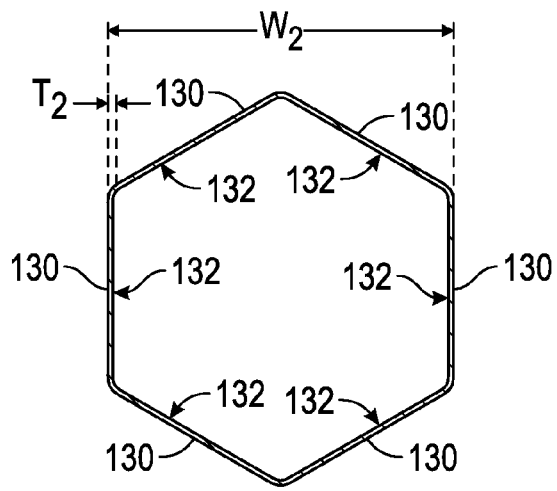
Figure 7:
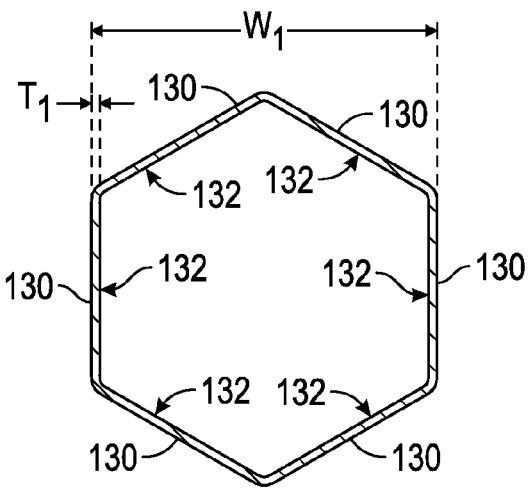
Figure 8A:
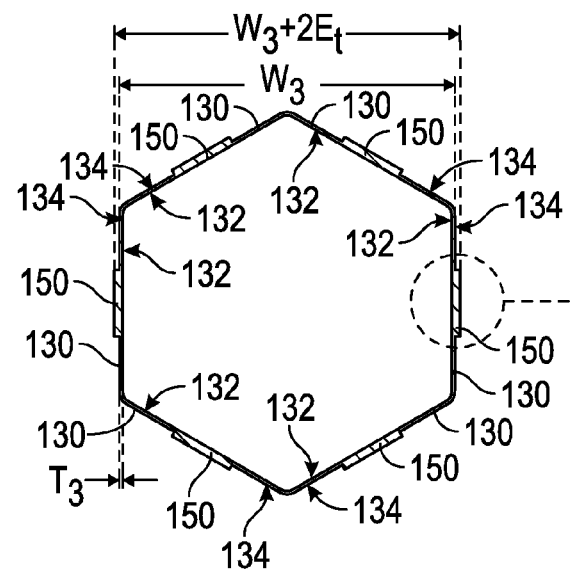
Figure 8B:
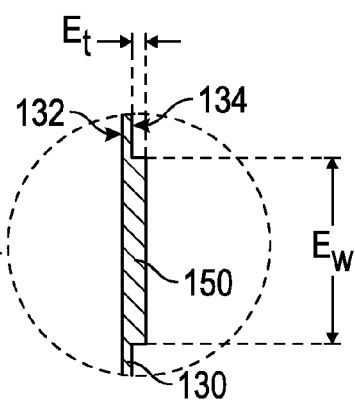
FIG. 8B is a detail view of the cross-sectional view of FIG. 8A, according to one embodiment.

As shown in FIGS. 5-8B, sidewalls 130 of tubular body 120 each have an inner face 132 and an outer face 134. As shown in FIGS. 5 and 8A-8B, elongated member 150 extends from outer face 134 of sidewall 130. FIGS. 6-8A show cross sections of tubular body 120 along the lines 6-6, 7-7, and 8A-8A, respectively. As shown in FIG. 7, tubular body 120 has a first width $W_1$ along the portion sectioned by line 7-7, and sidewalls 130 have a first thickness $T_1$. In one embodiment, the portion of tubular body 120 sectioned by line 7-7 is a load pad having a thickness of four millimeters. As shown in FIG. 6, tubular body 120 has a second width $W_2$ along the portion sectioned by line 6-6, and sidewalls 130 have a second thickness $T_2$. As shown in FIG. 8a, tubular body 120 has a third width $W_3$ along the portion sectioned by line 8A-8A, and sidewalls 130 have a third thickness $T_3$. In one embodiment, the second thickness and the third thickness are both equal to two millimeters. The second width and the third width both equal to 156 millimeters, and the first width is equal to 160 millimeters, according to one embodiment.

According to one embodiment, elongated member 150 has at least one of a specified width, a specified thickness, and a specified length. By way of example, the specified width, the specified thickness, and the specified length may facilitate the expansion of tubular body 120 according to a predetermined profile (e.g., a profile of expansion as a function of temperature, a profile of expansion as a function of time, etc.). By way of another example, the specified width, the specified thickness, and the specified length may facilitate coordinated expansion of tubular body 120 and nuclear fuel pins 112. As shown in FIG. 8B, elongated member 150 has a thickness $E_t$ and a width $E_w$. The width $E_w$ of elongated member 150 is thirty millimeters, according to one embodiment. In one embodiment, the thickness $E_t$ of elongated member 150 is equal to two millimeters such that the overall width of tubular body 120 and elongated members 150 is equal to 160 millimeters.

Figure 9:
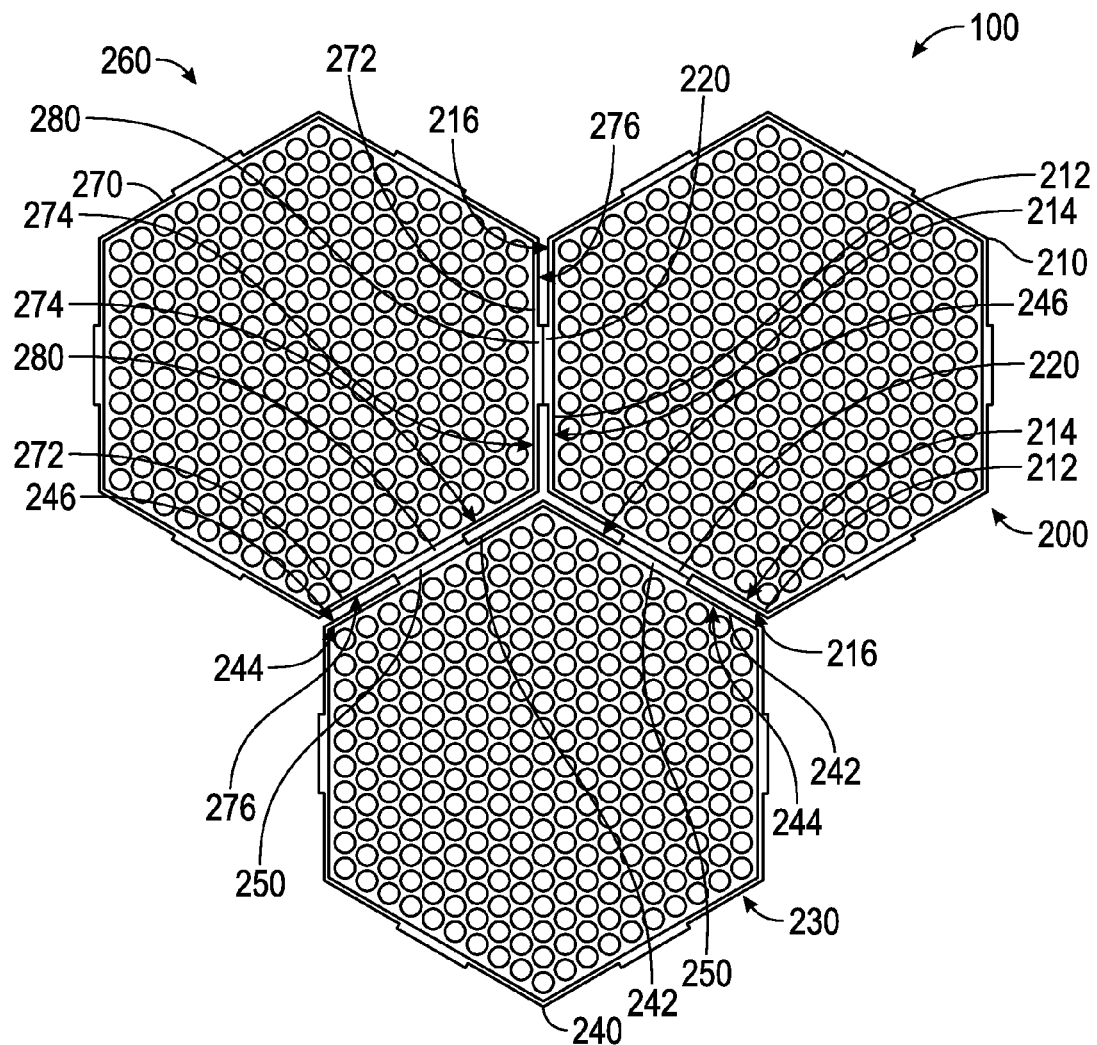
FIG. 9 is a sectional view of a nuclear fission reactor core including nuclear assemblies having elongated members, according to one embodiment.

Referring next to the partial sectional view of FIG. 9, nuclear fission reactor core 100 includes a first nuclear fuel assembly, shown as first fuel assembly 200, a second nuclear fuel assembly, shown as second fuel assembly 230, and a third nuclear fuel assembly, shown as third fuel assembly 260. As shown in FIG. 9, first fuel assembly 200 includes a first tubular body 210 having a first sidewall 212 with an inner face 214 and an outer face 216. First fuel assembly 200 includes an elongated member, shown as first elongated member 220. First elongated member 220 extends from outer face 216 along at least a portion of the fuel region. According to the embodiment shown in FIG. 9, second fuel assembly 230 includes a second tubular body 240 having a second sidewall 242 with an inner face 244 and an outer face 246. Second fuel assembly 230 includes an elongated member, shown as second elongated member 250. Second elongated member 250 extends from outer face 246 along at least a portion of the fuel region. Referring still to FIG. 9, third fuel assembly 260 includes a third tubular body 270 having a sidewall 272 with an inner face 274 and an outer face 276. Third fuel assembly 260 includes an elongated member, shown as third elongated member 280. Third elongated member 280 extends from outer face 276 along at least a portion of the fuel region. As shown in FIG. 9, first tubular body 210, second tubular body 240, and third tubular body 270 are configured to contain nuclear fuel within a fuel region.

Figure 10:
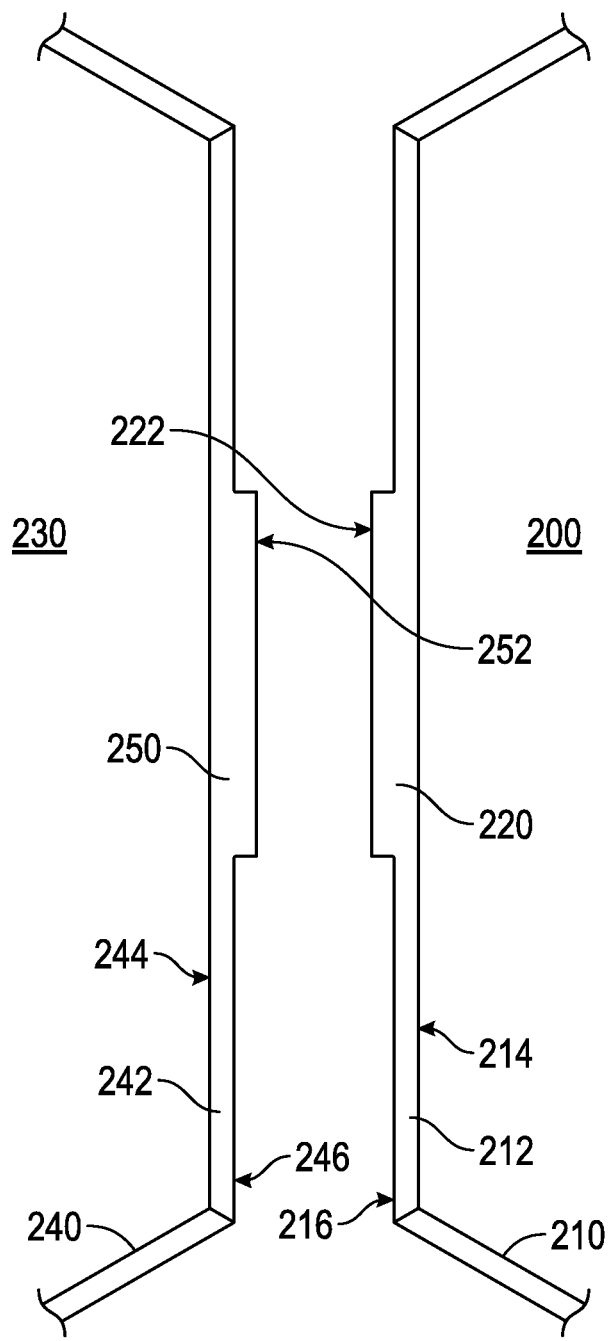
FIG. 10 is a detail sectional view of a nuclear fission reactor core including nuclear assemblies having elongated members, according to one embodiment.

As shown in the detail view of FIG. 10, first elongated member 220 and second elongated member 250 have a first contact surface 222 and a second contact surface 252, respectively. According to one embodiment, first contact surface 222 and second contact surface 252 are configured to stabilize first tubular body 210 and second tubular body 240 during operation of first fuel assembly 200 and second fuel assembly 230. As shown in FIG. 10, second contact surface 252 is a corresponding contact surface (i.e. a surface shaped to match first contact surface 222) configured to engage first contact surface 222 to stabilize first tubular body 210 during operation of the nuclear reactor. In some embodiments, first elongated member 220 and the second elongated member 250 have the same shape and contact one another along their respective lengths during operation of the nuclear reactor. According to one embodiment, the stability provided by engagement between the contact surfaces reduces the required duct structural material and interstitial sodium. These effects reduce the burnup requirement in the discharged fuel assemblies, allow the core designer the option to reduce core height, and allow the core designer to add sodium coolant inside the ducts, which improves the thermal hydraulic performance of the core.

Operation of the Nuclear Reactor

Figure 11A:
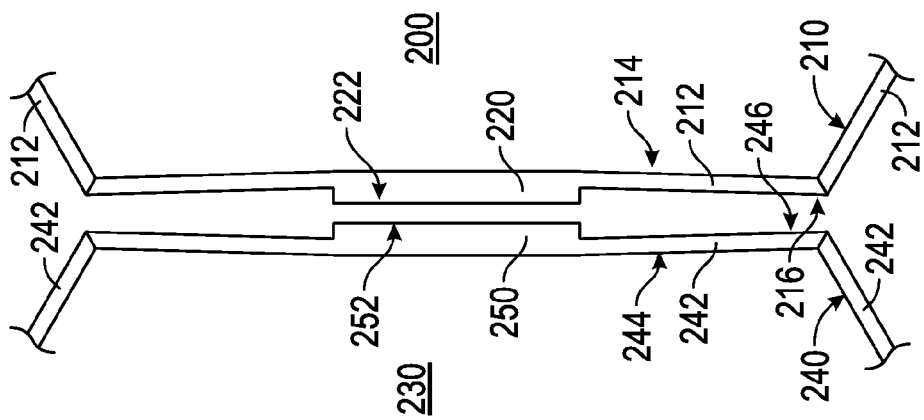
FIGS. 11A-11C are detail sectional views of the operation of a nuclear fission reactor core, according to one embodiment.
Figure 11B:
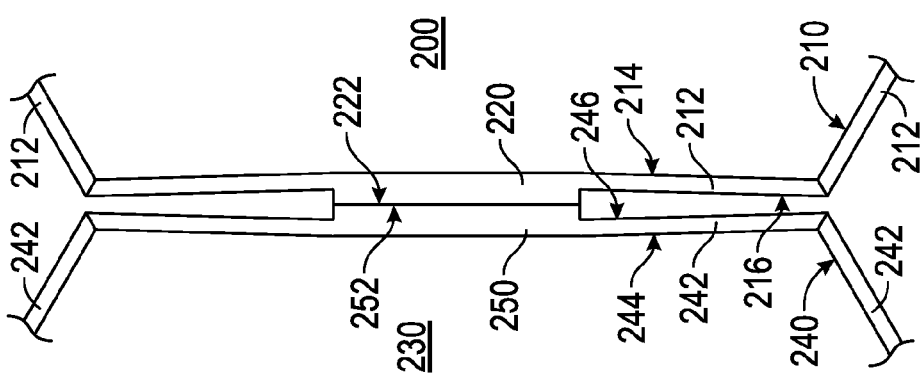
Figure 11C:
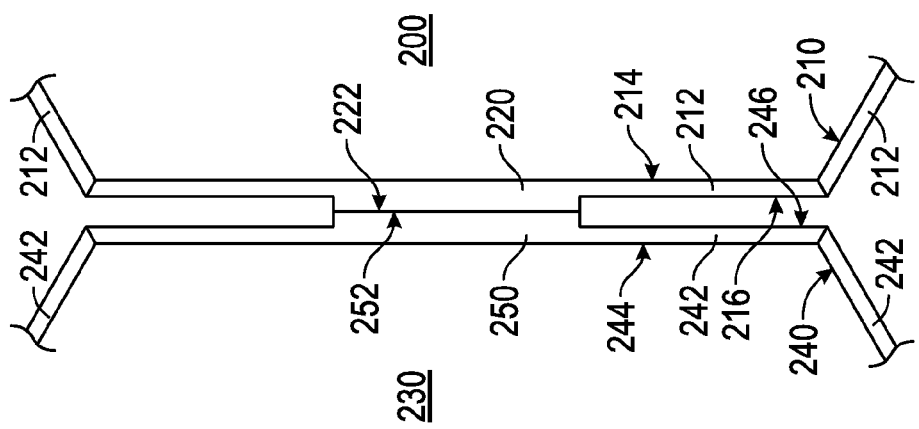

Referring next to FIGS. 11A-11C, operation of the nuclear reactor deforms first tubular body 210 and second tubular body 240. As shown in FIG. 11A, first tubular body 210 may be initially installed within the reactor core along second tubular body 240. In one embodiment, first tubular body 210 and second tubular body 240 are initially installed such that first contact surface 222 abuts second contact surface 252 before operation of the nuclear reactor. Accordingly, first elongated member 220 and second elongated member 250 space the tubular bodies prior to operation of the nuclear reactor. During an initial startup phase, first elongated member 220 and second elongated member 250 reduce the low power core instability of traditional reactor designs by providing duct-to-duct contact in the lower portion of the fuel region prior to the core going critical. As shown in FIG. 11A, first sidewall 212 and second sidewall 242 are flat plates prior to operation of the nuclear reactor. In other embodiments, first sidewall 212 and second sidewall 242 are initially otherwise shaped.

In other embodiments, first contact surface 222 is spaced from second contact surface 252 upon installation. The space between first contact surface 222 and second contact surface 252 may be defined as the shortest distance between first contact surface 222 and second contact surface 252. In another embodiment, the distance is defined as the shortest distance between a planar surface formed by the majority of the points on the first contact surface 222 and a planar surface formed by the majority of the points on the second contact surface 252. In one such embodiment, the distance during initial installation between the first contact surface 222 and the second contact surface 252 is less than two millimeters. First tubular body 210 and second tubular body 240 may be positioned such that first contact surface 222 is spaced from second contact surface 252. In another embodiment, first elongated member 220 and second elongated member 250 are shaped such that first contact surface 222 is spaced from second contact surface 252.

As the nuclear reactor operates, heat from the nuclear fission increases the temperature of the sodium coolant. Radioactive interactions due to the emission of high-energy neutrons lead to irradiation creep, void swelling, and duct dilation of first tubular body 210 and second tubular body 240. Pressure forces from the sodium coolant against inner face 214 and inner face 244 also deform first tubular body 210 and second tubular body 240. Such radioactive interactions and pressure forces bulge the sidewalls of traditional ducts for nuclear fuel assemblies and cause duct bowing and duct twist. Withdrawal loads are applied to a first end (e.g., the handling socket) and carried by the tubular body to a second end (e.g., the inlet nozzle) of the nuclear fuel assembly. Duct dilation, duct bowing, axial growth, and withdrawal forces limit the performance of traditional fuel assemblies. Duct dilation reduces the interstitial gaps (i.e. the spaces between tubular bodies) during service life and leads to large withdrawal loads.

According to one embodiment, elongated members extending from adjacent tubular bodies engage one another to stabilize the tubular bodies during operation of the nuclear reactor. Such stabilization reduces dilation, thereby improving the service life of the fuel assemblies. Engagement of the elongated members reduces the likelihood of core compaction and large reactivity step changes. Engagement of the elongated members isolates the life of the fuel assembly from the duct-to-duct gap, which collapses during operation of traditional duct assemblies and limits the life of the fuel assembly. In some embodiments, elongated members reduce the long-term degradation of the duct-to-duct gap in the limited free bow design, thereby improving the service lifetime of the fuel assembly.

Elongated members mitigate local duct face dilation by reducing the peak bending stresses to near (or below) the irradiation creep activation stress levels. The majority of forces and sidewall bending stresses are eliminated by cancelation of the internal duct pressure forces (i.e. the dilation forces due to the pressure of the coolant). Duct pressure forces are canceled because outward forces from one duct are opposed by forces from a neighboring duct, which are transferred through the elongated members. The difference between duct pressure forces of neighboring ducts is relatively small due to orificing, according to one embodiment. Such load conditions facilitate the reduction in the amount of structural steel for the tubular body and interstitial sodium, thereby increasing the power density of the fuel assembly.

As shown in FIG. 11B, radioactive interactions and pressure forces bulge first sidewall 212 and second sidewall 242. According to one embodiment, first tubular body 210 and second tubular body 240 do not significantly deform over the life of the nuclear reactor, thereby reducing the risk of core compaction and of decreased coolant flow through the core. Engagement of first contact surface 222 with second contact surface 252 stabilizes first tubular body 210 and second tubular body 240 by reducing the potential deformation of first sidewall 212 and second sidewall 242. In one embodiment, first elongated member 220 interlocks second elongated member 250 when first contact surface 222 engages second contact surface 252. The interlocking may further reduce slipping between first contact surface 222 and second contact surface 252, thereby limiting movement of first tubular body 210 and second tubular body 240. As shown in FIG. 11B, volumetric void swelling, the effect of void swelling in the duct wall, is reduced to inconsequential bulges (e.g., bulges up to ~600 displacements per atom) in first sidewall 212 and second sidewall 242 adjacent the elongated members, and the resulting spring force acting on adjacent tubular body is limited by creep, which dominates the void swelling induced strains in the bulged regions. As shown in FIGS. 11A-11B, the vertices of first sidewalls 212 and second sidewalls 242 are disposed closer to one another during operation of the nuclear reactor. Accordingly, the elongated members constructively direct material void swelling to specific regions of the perimeter of first tubular body 210 and second tubular body 240, while effectively eliminating creep induced duct dilation.

According to one embodiment, the tubular bodies manage the fuel pins of the nuclear fuel assemblies. As the nuclear reactor core operates, the pin bundle expands, potentially contributing to dilation of the tubular bodies. Due to engagement between the elongated members of neighboring fuel assemblies, the fuel pins may expand out into the regions adjacent to the elongated members. Such expansion promotes additional irradiation creep-induced dilation locally and accommodates swelling of the pin bundle. Accordingly, elongated members extending from the tubular body alleviate mismatch between fuel pin swelling and duct dilation.

In one embodiment, a first fuel assembly includes a first load pad and a second fuel assembly includes a second load pad. First tubular body 210 and second tubular body 240 may be initially installed such that first contact surface 222 is spaced from second contact surface 252 (e.g., a corresponding contact surface) and the first load pad is spaced from the second load pad. According to one embodiment, first tubular body 210 and second tubular body 240 may be positioned such that first contact surface 222 abuts second contact surface 252 at a first temperature and the first load pad abuts the second load pad at a second temperature. In one embodiment, the first the first temperature is lower than the second temperature. Such lower-temperature engagement of first contact surface 222 with second contact surface 252 causes stable radial expansion of the nuclear reactor core. In another embodiment, the first contact surface 222 abuts second contact surface 252 at the initial loading temperature and maintains engagement during operation of the nuclear reactor core. Such engagement may reduce the uncertainty in predicting core behavior during operation and facilitate operating the nuclear reactor core at higher powers, temperatures, and additional reactivity relative to traditional fast reactors.

Referring next to FIG. 11C, first tubular body 210 and second tubular body 240 contract during refueling or shuffling conditions (e.g., 320 degrees Celsius, a point where high temperature coolant no longer interacts with inner face 214 and inner surface 234). Such contraction causes first contact surface 222 and second contact surface 252 to retract from an engaged position shown in FIG. 11B. Retraction of first contact surface 222 and second contact surface 252 reduces withdrawal and insertion forces.

Elongated Member Configurations

Figure 12A:
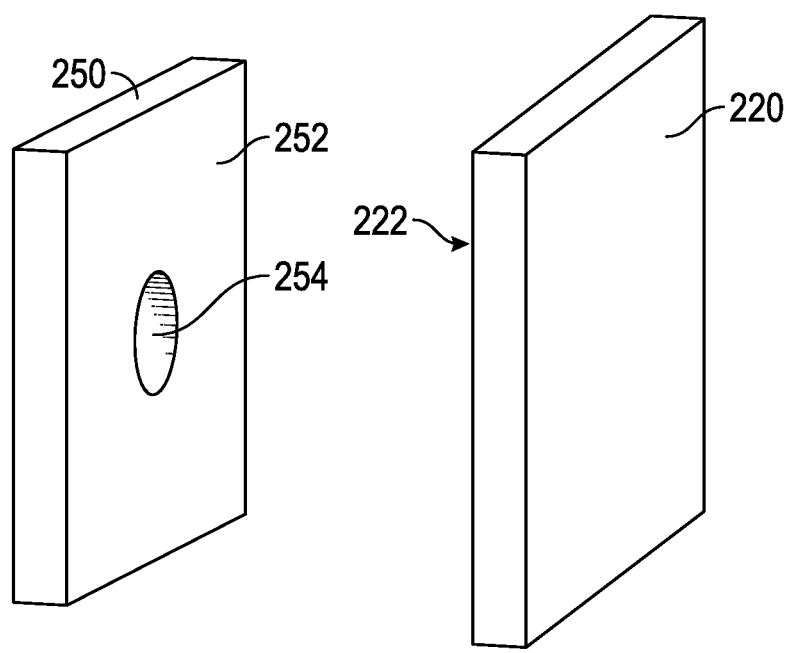
FIG. 12A is an elevation view of a first elongated member and a second elongated member for a nuclear fuel assembly, according to one embodiment.
Figure 12B:
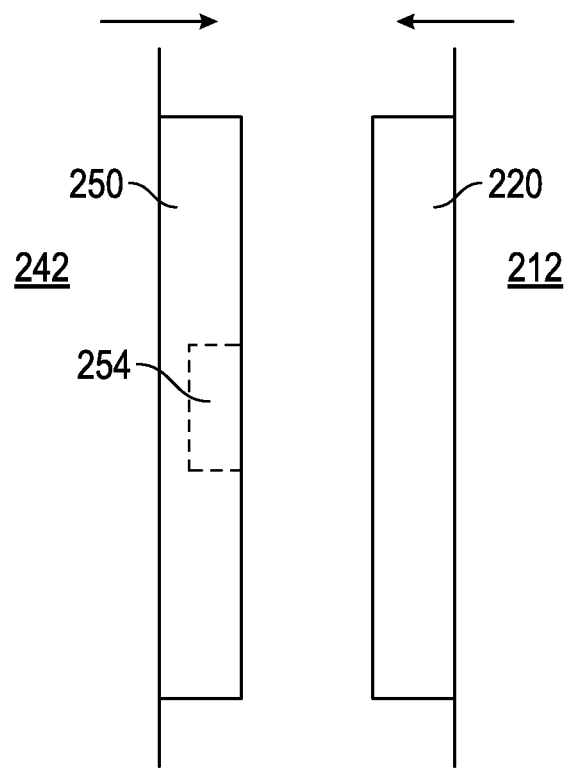
FIG. 12B is a side plan view of a first elongated member and a second elongated member for a nuclear fuel assembly, according to one embodiment.

Referring to FIGS. 12A-12B, second elongated member 250 defines a recess 254. As shown in FIGS. 12A-12B, recess 254 extends inward (i.e. toward a central axis of the nuclear fuel assembly) from second contact surface 252. Recess 254 reduces the surface area of second contact surface 252, thereby reducing the risk of bonding between first contact surface 222 and second contact surface 252 during operation of the nuclear reactor core. Recess 254 also reduces the mass of second elongated member 250, thereby improving the power density of the nuclear fuel assembly. In one embodiment, both first elongated member 220 and second elongated member 250 define a recess. In another embodiment, at least one of first elongated member 220 and second elongated member 250 define a plurality of recesses. The plurality of recesses may be defined according to a specified pattern (e.g., a rectangular array, a triangular array, a polar array, a spherical array, etc.).

As shown in FIGS. 12A-12B, recess 254 is a blind hole. In other embodiments, recess 254 is a hole that extends through second elongated member 250. According to the embodiment shown in FIG. 12A, recess 254 is circular. In other embodiments, recess 254 is otherwise shaped (e.g., hexagonal, rectangular, a slot extending along the length of second elongated member 250, a slot extending at least partially across the length of second elongated member 250, etc.).

According to another embodiment, second elongated member 250 includes a projection. The projection may extend outward from second contact surface 252. In one embodiment, the projection includes a pin. In another embodiment, the projection includes a strip extending across the length of second elongated member 250. Second elongated member 250 may include a single projection or may include a plurality of projections, according to various embodiments.

Referring next to FIGS. 13A-15D, first elongated member 220 interlocks second elongated member 250. Interlocking further reduces slipping between first contact surface 222 and second contact surface 252, thereby limiting movement of first tubular body 210 and second tubular body 240. In one embodiment, first elongated member 220 interlocks second elongated member 250 during operation of the nuclear reactor as first contact surface 222 engages second contact surface 252. As shown in FIGS. 13A-15D, first elongated member 220 interlocks second elongated member 250 during operation of the nuclear reactor before first contact surface 222 engages second contact surface 252.

According to one embodiment, second elongated member 250 includes a recess, and first elongated member 220 includes an interlocking projection. In one embodiment, the recess and the interlocking projection join first tubular body 210 and second tubular body 240 during operation of the nuclear reactor. As shown in FIGS. 13A-13B, second elongated member 250 includes a plurality of recesses 254 extending inwardly from first contact surface 222, and first elongated member 220 includes a plurality of interlocking projections, shown as interlocking projections 224. As shown in FIGS. 13A-13B, interlocking projections 224 extend outward (i.e. away from a central axis of the nuclear fuel assembly) from first contact surface 222. In one embodiment, ends of interlocking projections 224 are spaced from second contact surface 252 during initial installation of the nuclear fuel assemblies.

As shown in FIG. 13B, interlocking projections 224 extend into corresponding recesses 254 during operation of the nuclear reactor, as first tubular body 210 and second tubular body 240 expand and first elongated member 220 and second elongated member 250 are drawn together. Twisting of first tubular body 210 or second tubular body 240 (e.g., due to unequal thermal expansion along the length of the fuel assembly) reduces the life of the fuel assembly. In one embodiment, sidewalls of interlocking projections 224 contact inner surfaces of recesses 254, thereby providing a load path that reduces the likelihood of relative movement (e.g., slipping) between first tubular body 210 and second tubular body 240. As shown in FIG. 13B, first elongated member 220 fully interlocks the second elongated member 250 when the first contact surface 222 engages the second contact surface 252.

As shown in FIG. 13A, interlocking projections 224 are pins. According to the embodiment shown in FIG. 13A, the pins are cylindrical, and recesses 254 are circular blind holes. In other embodiments, interlocking projections 224 and recesses 254 are otherwise shaped (e.g., hexagonal, rectangular, etc.). In still other embodiments, recesses 254 are holes that extend through second elongated member 250.

Referring next to FIGS. 14A-14B, interlocking projection 224 includes a strip extending along a length of the first elongated member 220. As shown in FIG. 14A, recess 254 is a slot extending along the length of second elongated member 250. As shown in FIG. 14B, the strip extends into the slot during operation of the nuclear reactor. In one embodiment, sidewalls of interlocking projection 224 contact inner surfaces of recess 254, thereby providing a load path that reduces the likelihood of relative movement (e.g., slipping) between first tubular body 210 and second tubular body 240.

As shown in FIGS. 14A-14B, the strip has a rectangular cross-sectional shape. According to other embodiments, the strip has a trapezoidal cross-sectional shape or still another shape. While shown in FIGS. 14A-14B as extending along the length of first elongated member 220 and second elongated member 250, the strip and the slot may extend at least partially across the length of first elongated member 220 and second elongated member 250.

Referring to FIGS. 15A-15D, first elongated member 220 defines a plurality of interlocking projections 224, and second elongated member 250 defines a plurality of recesses 254. As shown in FIGS. 15A-15D, the plurality of interlocking projections 224 extend from first contact surface 222, and the plurality of recesses 254 extend inward from second contact surface 252. In one embodiment, the plurality of recesses 254 and the plurality of interlocking projections 224 join the first tubular body and the second tubular body at a plurality of sites during operation of the nuclear reactor.

In some embodiments, the plurality of recesses 254 and the plurality of interlocking projections 224 are defined according to a specified pattern. As shown in FIG. 15A, the plurality of recesses 254 and the plurality of interlocking projections 224 are defined in a rectangular three by two array. In other embodiments, the plurality of recesses 254 and the plurality of interlocking projections 224 are defined in a rectangular array having different dimensions. As shown in FIG. 15B, the plurality of recesses 254 and the plurality of interlocking projections 224 are defined in a triangular array. As shown in FIG. 15C, the plurality of recesses 254 and the plurality of interlocking projections 224 are defined in a polar array. As shown in FIG. 15D, the plurality of recesses 254 and the plurality of interlocking projections 224 are defined in a circular array.

Figure 16:
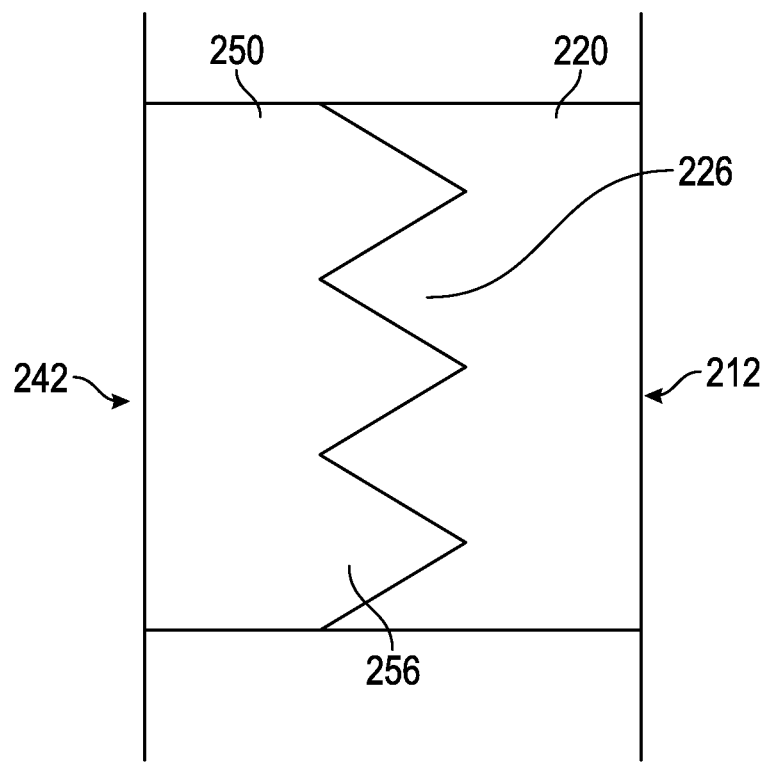
FIG. 16 is a side plan view of a first elongated member and a second elongated having interlocking teeth, according to one embodiment.

Referring next to FIG. 16, first elongated member 220 and second elongated member 250 define a plurality of interlocking teeth. As shown in FIG. 16, first elongated member 220 defines a first set of teeth, shown as teeth 226, and second elongated member 250 defines a second set of teeth, shown as teeth 256. According to one embodiment, teeth 226 engage teeth 256 to stabilize first tubular body 210 and second tubular body 242 during operation of the nuclear reactor. By way of example, a surface of teeth 226 may contact a surface of teeth 256, thereby providing an interface that carries loading, limits twist of first tubular body 210 and second tubular body 242, and prevents relative movement of first elongated member 220 and second elongated member 250. As shown in FIG. 16, teeth 226 and teeth 256 include tooth profiles that extend across the length of first sidewall 212 and second sidewall 242. In other embodiments, teeth 226 and teeth 256 include tooth profiles that extend along the length of first sidewall 212 and second sidewall 242 (i.e. the teeth may be longitudinal or extend laterally across the sidewalls).

Referring next to the embodiment shown in FIGS. 17A-17C, first contact surface 222 and second contact surface 252 have mating shapes. As shown in FIG. 17B, first contact surface 222 is concave. As shown in FIG. 17C, second contact surface 252 is convex. First contact surface 222 engages second contact surface 252 to stabilize first tubular body 210 and second tubular body 240 during operation of the nuclear reactor. As shown in FIG. 17A, first elongated member 220 has a first cross-sectional shape within a plane 300 that is perpendicular to outer face 216 of first tubular body 210. As shown in FIG. 17B, plane 300 extends across the lengths of first tubular body 210 and second tubular body 240. Second elongated member 250 has a second cross-sectional shape within plane 300. In one embodiment, the first cross-sectional shape is a negative of the second cross-sectional shape to facilitate engagement between first contact surface 222 and second contact surface 252. According to another embodiment, first elongated member 220 has a first cross-sectional shape within a plane 310 that is perpendicular to outer face 216 of first tubular body 210. As shown in FIG. 17B, plane 310 extends along the lengths of first tubular body 210 and second tubular body 240. Second elongated member 250 has a second cross-sectional shape within plane 310. In one embodiment, the first cross-sectional shape is a negative of the second cross-sectional shape to facilitate engagement between first contact surface 222 and second contact surface 252.

According to one embodiment, first elongated member 220 and second elongated member 250 have specified cross-sectional shapes within a plane orthogonal to longitudinal axes along which first tubular body 210 and second tubular body 240 extend. As shown in FIGS. 17B-17C, first elongated member 220 is plano-concave and second elongated member 250 is plano-convex. In other embodiments, at least one of first elongated member 220 and second elongated member 250 have cross-sectional shapes that are rectangular, trapezoidal, plano-convex, plano-concave, bi-convex, or bi-concave. First contact surface 222 and second contact surface 252 may be planar, substantially flat, arcuate, domed, concave, and convex. In one embodiment, first elongated member 220 and second elongated member 250 have mating cross-sectional shapes, thereby further stabilizing the nuclear fuel assemblies during operation of the nuclear reactor.

Figure 18A:
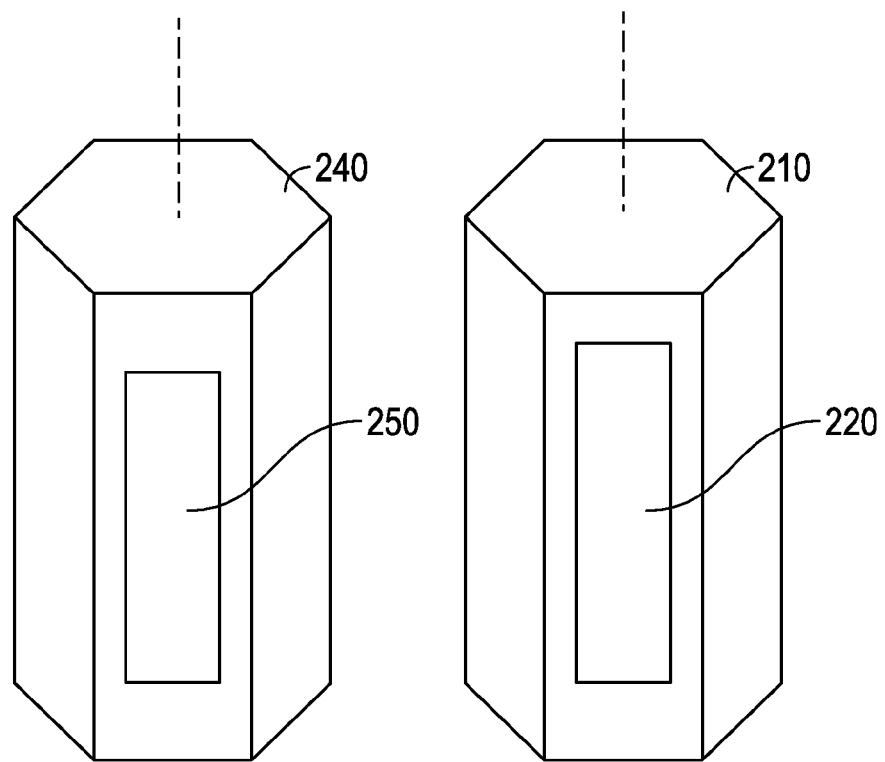
FIGS. 18A-18B are elevation views of a first tubular body and a second tubular body arranged parallel and angularly offset, according to various embodiments.
Figure 18B:
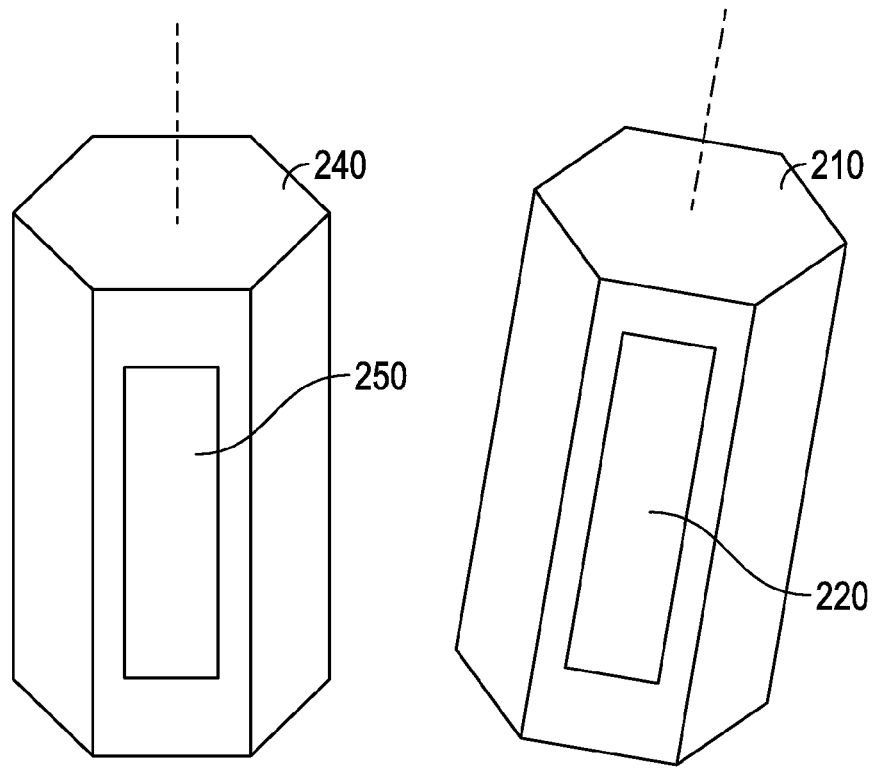

Referring next to the embodiments shown in FIGS. 18A-18B, the relative positions of first tubular body 210 and second tubular body 240 varies the engagement of first elongated member 220 and second elongated member 250. As shown in FIG. 18A, first tubular body 210 is positioned parallel to second tubular body 240. As shown in FIG. 18B, first tubular body 210 is angularly offset from second tubular body 240. According to one embodiment, angularly offsetting first tubular body 210 from second tubular body 240 facilitates engagement of first elongated member 220 with second elongated member 250 along the length of the fuel assembly, thereby reducing dilation and improving the service life of the fuel assembly. While shown with a single elongated member, it should be understood that a plurality of elongated members may extend from sidewalls of the tubular bodies. Such elongated members may be angularly offset toward or away from one another, according to various embodiments, where one tubular body is angularly offset from another tubular body.

Tapered Elongated Members

Figure 19A:
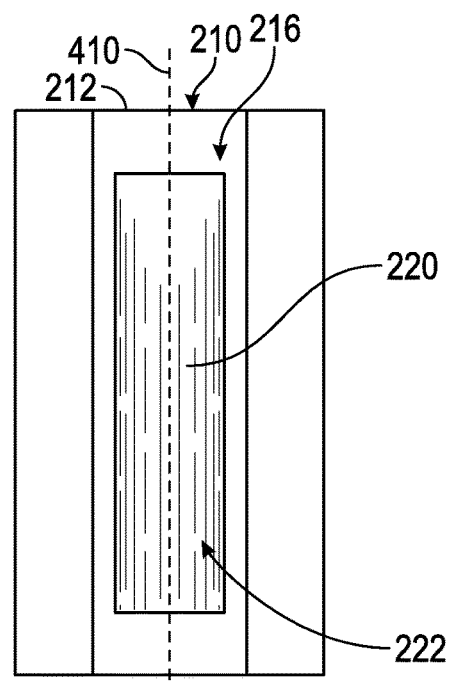
FIGS. 19A-19B are plan views of an elongated member having a thickness that changes along the length of a tubular body, according to one embodiment.
Figure 19B:
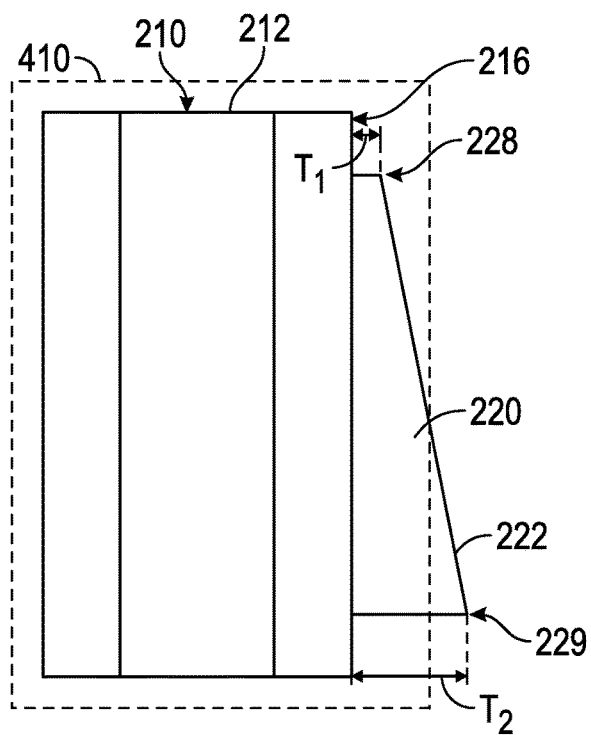
Figure 20:
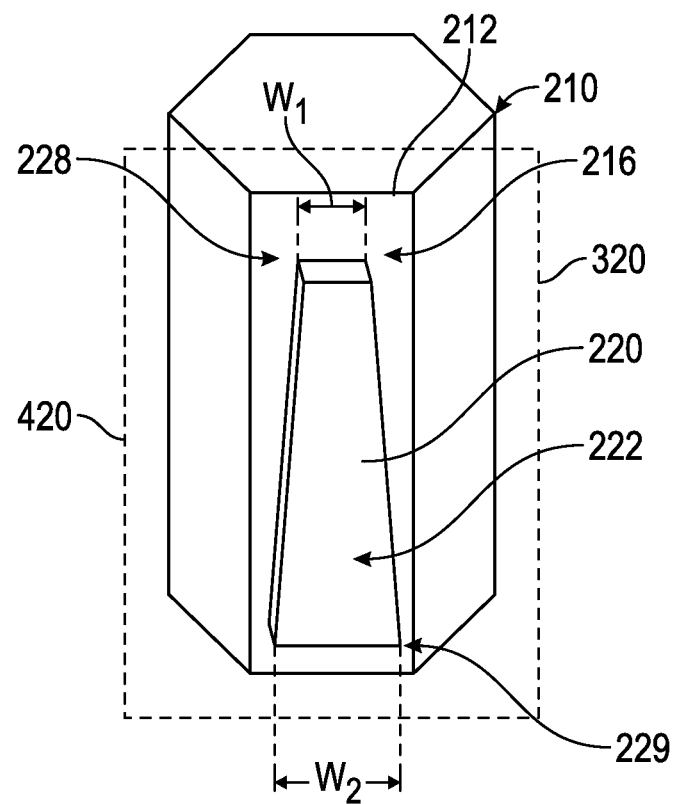
FIG. 20 is an elevation view of an elongated member having a width that changes along the length of a tubular body, according to one embodiment.

Referring to FIGS. 19A-20, first elongated member 220 has a tapered cross-sectional shape. As shown in FIGS. 19A-19B, first tubular body 210 extends along a longitudinal axis. Plane 410 is perpendicular to outer face 216 and extends along the longitudinal axis. According to one embodiment, first elongated member 220 has a cross sectional shape that is tapered such that a first end 228 of first elongated member 220 has a first thickness $T_1$ and a second end 229 of first elongated member 220 has a second thickness $T_2$. As shown in FIGS. 19A-19B, the second thickness is greater than the first thickness. In other embodiments, the first thickness is greater than the second thickness.

In one embodiment, the thinner portion of first elongated member 220 is positioned toward the top of the nuclear reactor core. Where the temperature of the core decreases from a higher-temperature upper region to a lower-temperature lower region, higher-temperature coolant interfaces with the upper portion of first elongated member 220, thereby causing greater thermal expansion relative to the expansion caused by the interaction of the coolant toward the bottom of the nuclear reactor core with the lower portion of first elongated member 220. In one embodiment, the thickness of first elongated member 220 varies from the first thickness to the second thickness according to a specified profile such that the contact surfaces of neighboring elongated members engage along a plane that is parallel to the extension axes of the tubular bodies. In one embodiment, the specified profile provides a thickness of first elongated member 220 that is uniform along the length of first tubular body 210 during operation of the nuclear reactor. In another embodiment, the specified profile controls the bulge of first sidewall 212 during operation of the nuclear reactor (e.g., controls the bulge of first sidewall 212 as a function of time). Controlling the bulge of first sidewall 212 may provide expansion characteristics that are matched for first tubular body 210 and the pin bundle, which may be exposed to different temperatures or flux and may be manufactured from different materials (e.g., D9 for first tubular body 210 and HT-9 for the pins of the pin bundle). The specified profile may accommodate for pins that swell faster and push or bulge the tubular bodies by having elongated members of neighboring fuel assemblies engaged or under more compression at an earlier time during irradiation. In another embodiment, the specified profile may reduce the risk that the tubular bodies will swell faster than the pins of the pin bundle, which would leave a bypass flow path for coolant around the pin bundle, by having elongated members of neighboring fuel assemblies engaged at an earlier time during irradiation.

Referring to FIG. 20, first elongated member 220 has a tapered cross-sectional shape within a plane 420, which is parallel to outer face 216. According to the embodiment shown in FIG. 20, first end 228 of first elongated member 220 has a first width $W_1$ and second end 229 of first elongated member 220 has a second width $W_2$. As shown in FIG. 20, the second width is greater than the first width. In other embodiments, the first width is greater than the second width. In one embodiment, at least one of the first width and the second width is specified to control the bulge of first sidewall 212 during operation of the nuclear reactor (e.g., control the bulge of first sidewall 212 as a function of time).

Area of Elongated Members

Referring still to FIGS. 19A-20, the ratio of the surface area of outer face 216 to the surface area of first contact surface 222 defines an area ratio. The surface area of outer face 216 is determined by multiplying the height of first tubular body 210 by the width of first sidewall 212, according to one embodiment. The surface area of first contact surface 222 is determined by multiplying the length of first contact surface 222 by the width of first elongated member 220, according to the embodiment shown in FIGS. 19A-19B. According to the embodiment shown in FIG. 20, where the width of first elongated member 220 changes linearly from the first thickness to the second thickness, the area of first contact surface 222 is determined by multiplying the height of first elongated member 220 by the sum of the first width and the second width and dividing by two. In one embodiment, the area ratio is greater than one. In another embodiment, the area ratio is between one and ten. In yet another embodiment, the area ratio is between one and five.

According to the embodiments shown in FIGS. 19A-20, the portion of first elongated member 220 at outer face 216 has a surface area that is equalized with the surface area of first contact surface 222. As shown in FIGS. 19A-20, first elongated member 220 includes a pair of sidewalls that are perpendicular to the outer face 216. As shown in FIG. 19A, the pair of sidewalls extends along a length of first tubular body 210. As shown in FIG. 20, the pair of sidewalls is angularly offset from the length of first tubular body 210.

In one embodiment, the first contact surface 222 is hardened. By way of example, first contact surface 222 may be hardened using welding, PVD, electrochemical deposition, or still other techniques. Hardening first contact surface 222 improves the wear resistance of first elongated member 220, according to one embodiment, thereby improving the performance of the fuel assembly. Hardening first contact surface 222 may also reduce the risk of coupling neighboring elongated members, which would increase the force needed to extract a fuel assembly.

Illustrative Methods

FIGS. 21A-22E are a series of flowcharts depicting implementations. For ease of understanding, the flowcharts are organized such that the initial flowcharts present implementations via an example implementation and thereafter the following flowcharts present other implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Embodiments of the duct may be manufactured in one or more pieces and may be drawn with integrated load pads and elongated members, by changing the dies to effect the desired end shape. In another embodiment, the elongated members may be manufactured using a machining, welding, or fastening process. Elongated members and features added to the elongated members may be reduced in volume by machining or drilling to reduce the amount of structural material without affecting the duct performance.

FIGS. 21A-21J provide illustrative flow diagrams for a method of manufacturing a duct for a nuclear fuel assembly, shown as method 500, according to one embodiment. Although the method is presented as a sequence of steps for illustrative purposes, this sequence does not limit the scope of the claimed methods, and those of ordinary skill in the art will be aware of modifications and variations that may be made to the sequence.

Figure 21A:
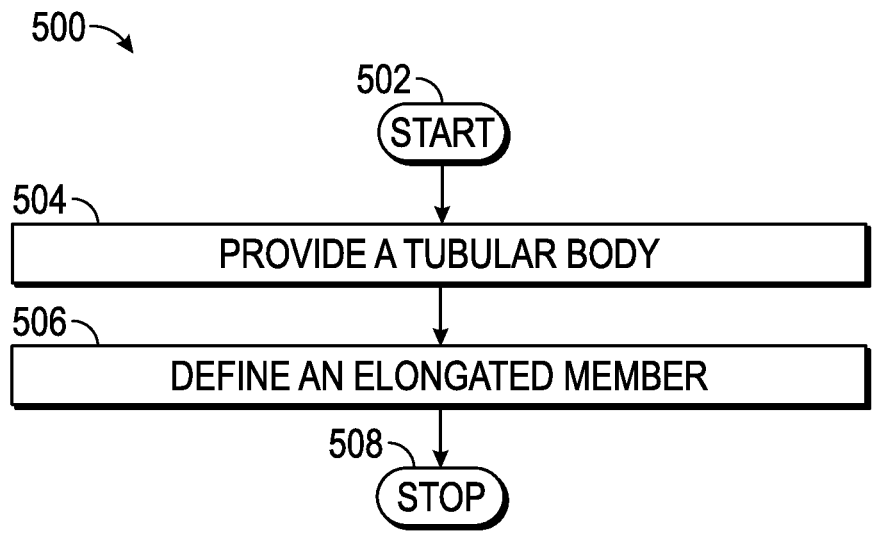
FIGS. 21A-21J are schematic diagrams of a method of manufacturing a duct for a nuclear fuel assembly, according to one embodiment.

Referring to FIG. 21A, method 500 starts at block 502. At block 504, a tubular body is provided. In one embodiment, the tubular body has a sidewall with an inner face and an outer face. The tubular body is configured to contain nuclear fuel within a fuel region.

At block 506, an elongated member is defined. In one embodiment, the elongated member is defined on the outer face along at least a portion of the fuel region. The elongated member has a contact surface configured to stabilize the duct during operation of the nuclear fuel assembly. In one embodiment, method 500 stops at block 508. In other embodiments, method 500 continues. Additional method steps are set forth below by way of non-limiting example.

Figure 21B:
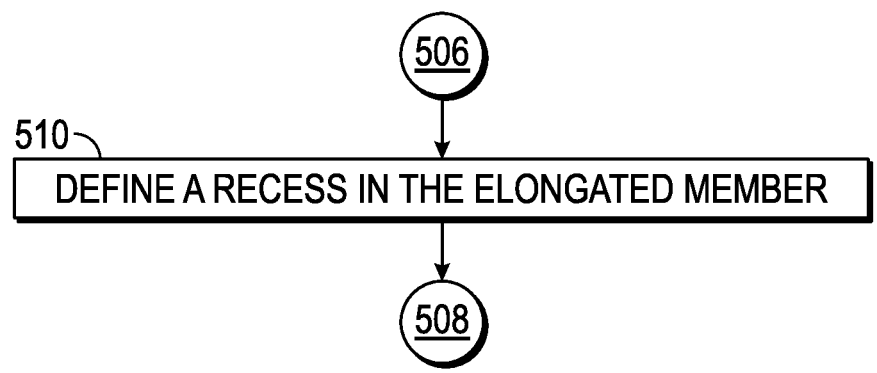
Figure 21C:
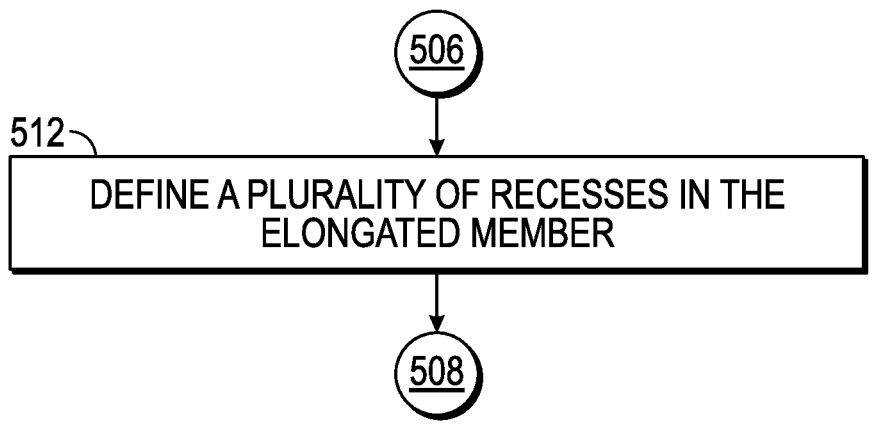
Figure 21D:
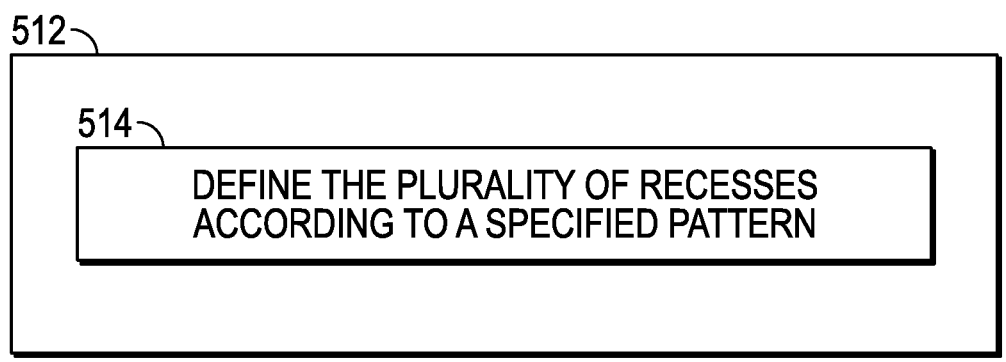
Figure 21E:
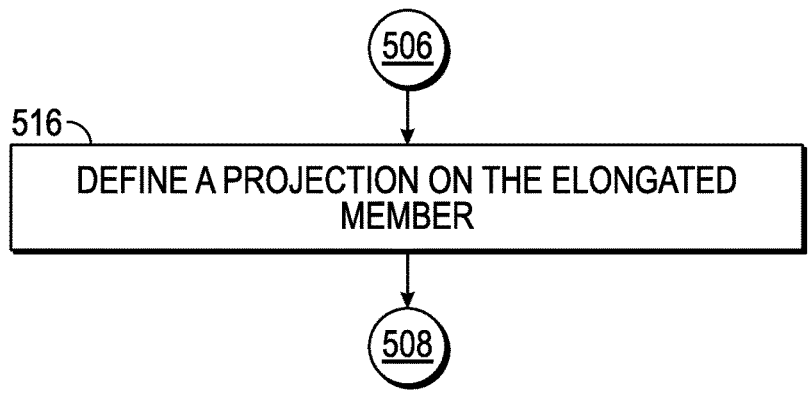
Figure 21F:
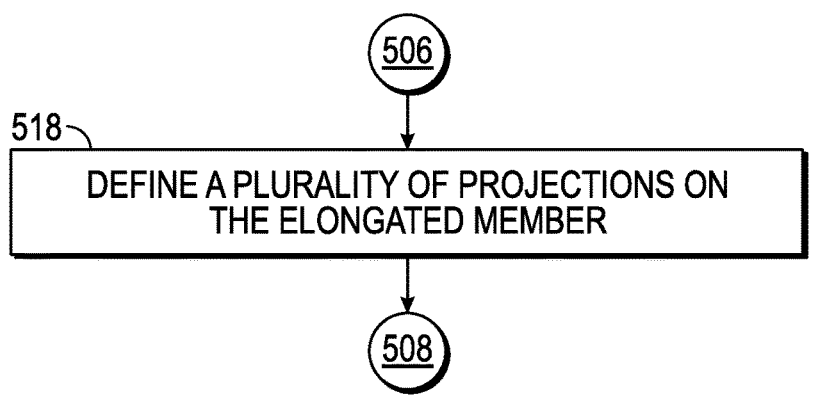
Figure 21G:
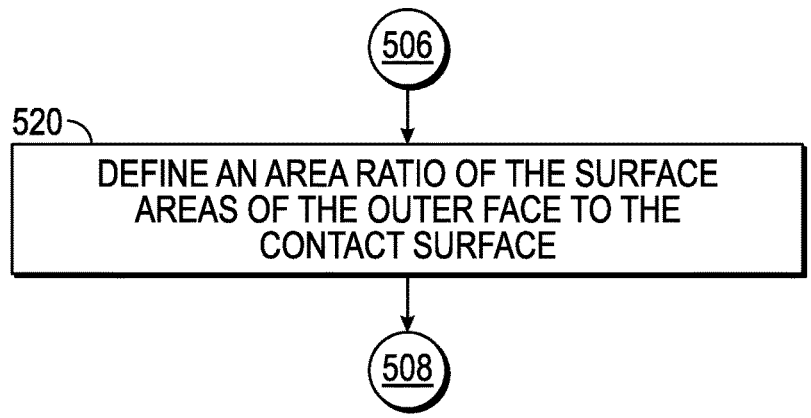

Referring to FIG. 21B, a recess is defined in the elongated member at block 510. Referring to FIG. 21C, a plurality of recesses are defined in the elongated member at block 512. Referring to FIG. 21D, in some embodiments, defining a plurality of recesses in the elongated member at block 512 may include defining the plurality of recesses according to a specified pattern at block 514. Referring to FIG. 21E, a projection is defined on the elongated member at block 516. Referring to FIG. 21F, a plurality of projections are defined on the elongated member at block 518. Referring to FIG. 21G, in some embodiments, an area ratio of the surface areas of the outer face to the contact surface is defined at block 520.

Figure 21H:
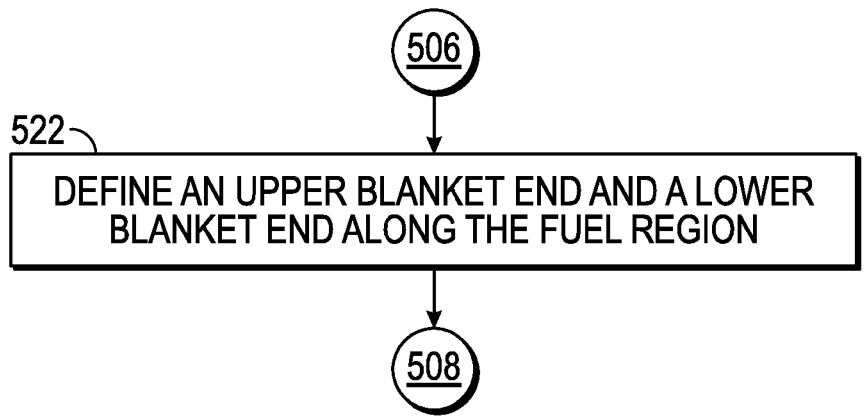
Figure 21I:
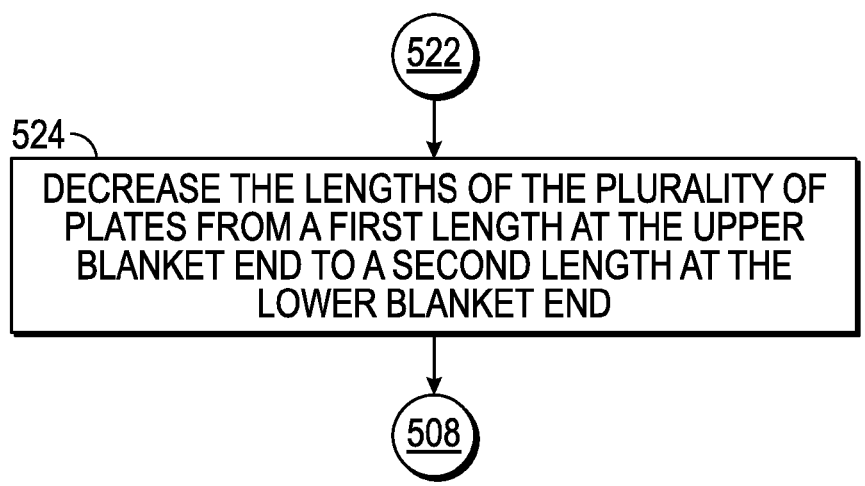
Figure 21J:
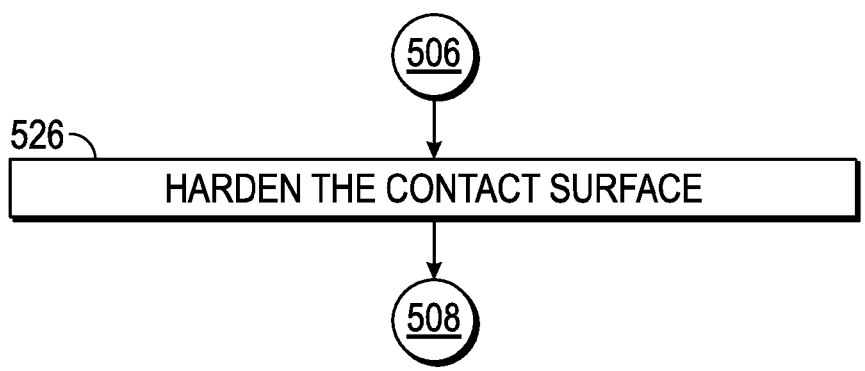

In one embodiment, the elongated member includes a plurality of plates defining a plurality of slots that extend across a longitudinal axis of the tubular body. Referring to FIG. 21H, an upper blanket end and a lower blanket end are defined along the fuel region at block 522. As shown in FIG. 21I, the lengths of the plurality of plates is decreased from a first length at the upper blanket end to a second length at the lower blanket end at block 524. Referring to FIG. 21J, the contact surface is hardened at block 526.

FIGS. 22A-22E provide illustrative flow diagrams for a method 600 of loading a nuclear reactor, according to one embodiment. Although the method is presented as a sequence of steps for illustrative purposes, this sequence does not limit the scope of the claimed methods, and those of ordinary skill in the art will be aware of modifications and variations that may be made to the sequence.

Figure 22A:
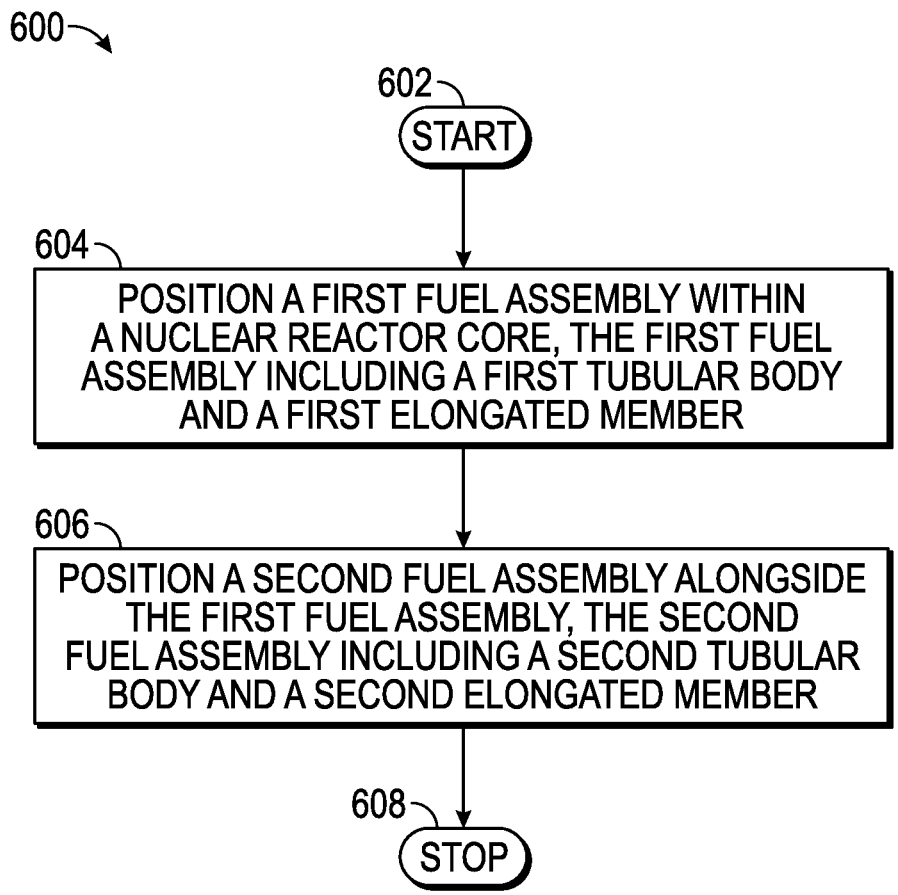
FIGS. 22A-22E are schematic diagrams of a method of loading a nuclear reactor, according to one embodiment.

Referring to FIG. 22A, method 600 starts at block 602. At block 604, a first fuel assembly is positioned within a nuclear reactor core. In one embodiment, the first fuel assembly includes a first tubular body having a sidewall with an inner face and an outer face, and the first tubular body is configured to contain nuclear fuel within a fuel region. The first fuel assembly also includes a first elongated member extending from the outer face along at least a portion of the fuel region, the first elongated member having a first contact surface. At block 606, a second fuel assembly is positioned alongside the first fuel assembly. In one embodiment, the second fuel assembly includes a second tubular body having a sidewall with an inner face and an outer face and a second elongated member extending from the outer face. The second elongated member has a corresponding contact surface configured to engage the first contact surface to stabilize the first tubular body and the second tubular body during operation of the nuclear reactor. In one embodiment, method 600 stops at block 608. In other embodiments, method 600 continues. Additional method steps are set forth below by way of non-limiting example.

Figure 22B:
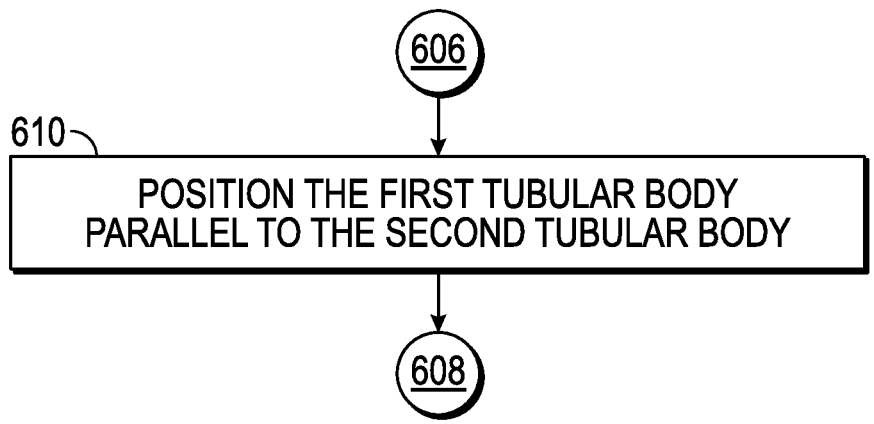
Figure 22C:
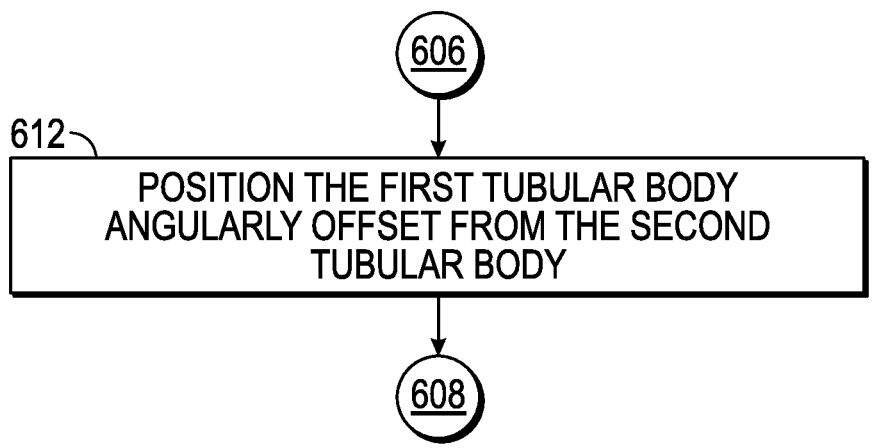
Figure 22D:
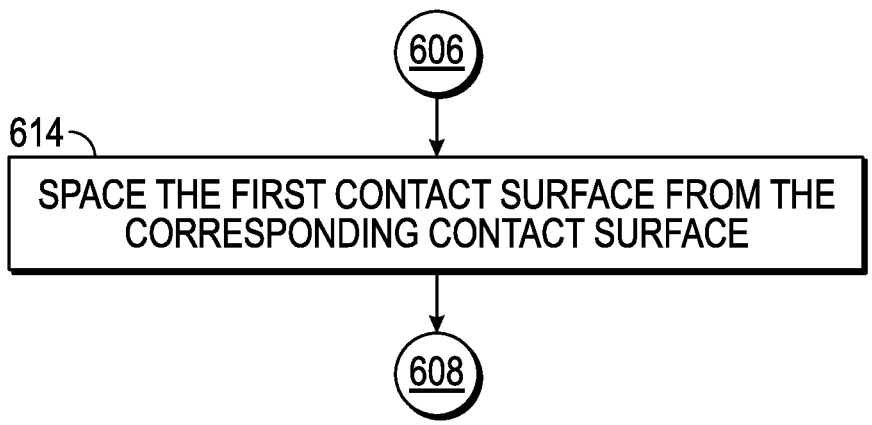
Figure 22E:
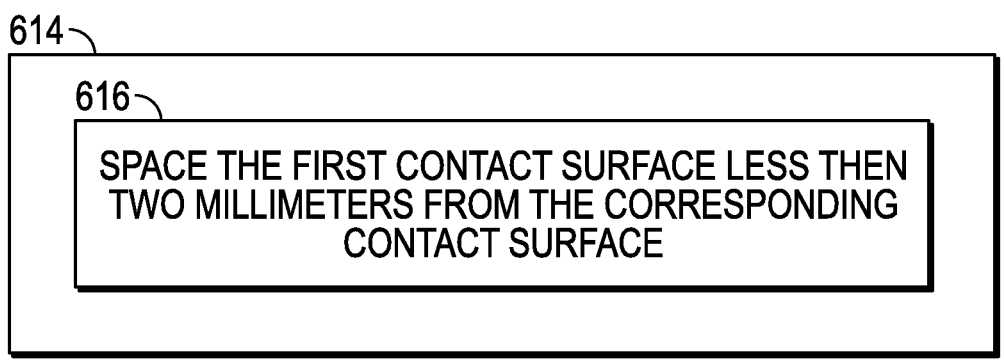

Referring to FIG. 22B, the first tubular body is positioned parallel to the second tubular body at block 610. Referring to FIG. 22C, the first tubular body is positioned angularly offset from the second tubular body at block 612. Referring to FIG. 22D, the first contact surface is spaced from the corresponding contact surface at block 614. Referring to FIG. 22E, in some embodiments, spacing the first contact surface from the corresponding contact surface at block 614 may include spacing the first contact surface less than two millimeters from the corresponding contact surface at block 616.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A nuclear reactor, the reactor comprising:
   a reactor vessel with a nuclear reactor core;
   a first fuel duct disposed within the nuclear reactor core, the first fuel duct including a first tubular body configured to contain nuclear fuel within a first fuel region;
   a second fuel duct disposed within the nuclear reactor core, the second fuel duct positioned adjacent to the first fuel duct and including a second tubular body configured to contain fuel within a second fuel region;

a first elongated member extending from an outer face of the first tubular body and adjacent to at least a portion of the first fuel region, the first elongated member having a first contact surface; and a second elongated member extending from an outer face of the second tubular body and adjacent to at least a portion of the second fuel region, the second elongated member having a second contact surface facing the first contact surface, the first contact surface spaced apart from the second contact surface at a first temperature of the nuclear reactor core and abutting the second contact surface at a second different temperature of the nuclear reactor core.

2. The nuclear reactor of claim 1, further comprising a recess defined in the first elongated member, the recess extending inwardly from the contact surface.

3. The nuclear reactor of claim 2, wherein the recess includes a blind hole.

4. The nuclear reactor of claim 3, wherein the recess is circular, hexagonal, or rectangular.

5. The nuclear reactor of claim 2, wherein the recess includes a slot extending along a length of the first elongated member.

6. The nuclear reactor of claim 2, wherein the recess includes a slot extending at least partially across the length of the first elongated member.

7. The nuclear reactor of claim 2, further comprising a plurality of recesses defined in the first elongated member, the plurality of recesses extending inwardly from the first contact surface.

8. The nuclear reactor of claim 7, wherein the plurality of recesses are defined according to a symmetric pattern.

9. The nuclear reactor of claim 8, wherein the plurality of recesses are defined in a rectangular, a triangular, a polar, or a spherical array.

10. The nuclear reactor of claim 1, wherein the first elongated member includes a cylindrical pin.

11. The nuclear reactor of claim 1, wherein the first elongated member includes a strip defined by a first dimension measurable along a longitudinal axis of the first elongated member and a second dimension perpendicular to the first dimension, the strip longer in the first dimension than in the second dimension.

12. The nuclear reactor of claim 1, wherein the first elongated member includes a plurality of projections.

13. The nuclear reactor of claim 1, wherein the first tubular body extends along a longitudinal axis and wherein the first elongated member has a cross-sectional shape within a plane orthogonal to the longitudinal axis that is rectangular, trapezoidal, plano-convex, plano-concave, bi-convex, or bi-concave.

14. The nuclear reactor of claim 1, wherein the first tubular body extends along a longitudinal axis, wherein the first elongated member has a cross-sectional shape within a plane perpendicular to the outer face and extending along the longitudinal axis, wherein the cross-sectional shape is tapered such that a first end of the elongated member has a first thickness and a second end of the first elongated member has a second thickness.

15. The nuclear reactor of claim 1, wherein the first elongated member has a first thickness at a first end and a second different thickness at a second opposite end, wherein the first thickness and the second thickness are measured in a direction perpendicular to a longitudinal axis of the first elongated member.

16. The nuclear reactor of claim 1, wherein the first contact surface is concave and the second contact surface is convex.

17. The nuclear reactor of claim 1, wherein the first elongated member has a cross-sectional shape within a plane parallel to the outer face of the first fuel duct that is tapered such that a first end of the first elongated member has a first width and a second end of the first elongated member has a second width.

18. The nuclear reactor of claim 1, wherein the first contact surface is at least one of arcuate, domed, concave, and convex.

19. The nuclear reactor of claim 1, wherein a ratio of the surface area of the outer face of the first fuel duct to the first contact surface defines an area ratio and wherein the area ratio is greater than one.

20. The nuclear reactor of claim 19, wherein the area ratio is between one and ten.

21. The nuclear reactor of claim 19, wherein the area ratio is between one and five.

22. The nuclear reactor of claim 1, wherein the first elongated member includes a pair of sidewalls that are perpendicular to the outer face of the first tubular body.

23. The nuclear reactor of claim 22, wherein the pair of sidewalls have a first thickness at an upper end and a second different thickness at a lower end.

24. The nuclear reactor of claim 1, wherein the first elongated member includes a plurality of plates each including a plurality of slots that extend across a longitudinal axis of the first tubular body.

25. The nuclear reactor of claim 24, wherein the plurality of plates each have a uniform width.

26. The nuclear reactor of claim 24, wherein the plurality of plates each have a uniform length.

27. The nuclear reactor of claim 24, wherein the first tubular body of the first fuel duct is angularly offset with respect to the second tubular body of the second fuel duct.

28. The nuclear reactor of claim 1, wherein the first contact surface is hardened by a hardening process.

* * * * *